United States Patent
Serena

(10) Patent No.: US 11,886,403 B1
(45) Date of Patent: Jan. 30, 2024

(54) APPARATUS AND METHOD FOR DATA DISCREPANCY IDENTIFICATION

(71) Applicant: 1370092 Ontario Ltd., Waterdown (CA)

(72) Inventor: Nicole Serena, Waterdown (CA)

(73) Assignee: 1370092 Ontario Ltd., Waterdown (CA)

( * ) Notice: Subject to any disclaimer, the term of this patent is extended or adjusted under 35 U.S.C. 154(b) by 0 days.

(21) Appl. No.: 18/208,961

(22) Filed: Jun. 13, 2023

(51) Int. Cl.
*G06F 16/00* (2019.01)
*G06F 16/215* (2019.01)
*G06F 16/23* (2019.01)

(52) U.S. Cl.
CPC ........ *G06F 16/215* (2019.01); *G06F 16/2358* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 7,069,240 B2 | 6/2006 | Spero | |
| 7,809,615 B2 | 10/2010 | Hui | |
| 8,204,809 B1* | 6/2012 | Wise | G06Q 40/06 705/36 R |
| 2006/0095372 A1 | 5/2006 | Venkatasubramanian | |
| 2010/0189325 A1* | 7/2010 | Garg | G06V 10/44 382/199 |
| 2012/0131040 A1* | 5/2012 | Wong | G06F 16/215 707/769 |
| 2012/0330831 A2* | 12/2012 | Ross | G06Q 20/10 705/44 |
| 2017/0004167 A1* | 1/2017 | Bauer | G06F 16/2365 |
| 2022/0253592 A1* | 8/2022 | Rao | G16H 30/20 |

\* cited by examiner

*Primary Examiner* — Bai D Vu
(74) *Attorney, Agent, or Firm* — Caldwell Intellectual Property Law

(57) ABSTRACT

Apparatus and method for data discrepancy identification are disclosed. The apparatus includes a memory communicatively connected to at least a processor, wherein the memory contains instructions configuring the at least a processor to authenticate a provider using a provider identifier, receive at least a record from the provider, wherein the at least a record includes a plurality of record elements, obtain at least a proof, wherein the at least a proof includes a plurality of proof elements, analyze the at least a record to find a data discrepancy, wherein analyzing further includes retrieving a discrepancy template and finding the data discrepancy of the at least a record as a function of the at least a proof and the discrepancy template, determine a discrepancy process as a function of the data discrepancy and update the at least a record as a function of the discrepancy process.

20 Claims, 12 Drawing Sheets

Pending Reviews > Vendor Report

PSP RAAST v1.0 Production

| Vendor Name: | ABC |
|---|---|
| CoPay Period: | June 15 2022 to July 14 2022 |
| Total CoPay Amt: | $1,240,000 |

| # of CoPay Records: | 231 |
|---|---|
| # of Failed Comparisons: | 11 |
| Failed Item CoPay Amt: | $41,400 |

Filter Records (showing 11 of 231)

Status: Failed Comparisons Only ▼    Clear Filter

| Patient ID | Dispense Date | Prescription Number | Prescription Total | CoPay Amount | Pharmacy ID | Pharmacy Province | Failed Rule(s) | Exception Approved? |
|---|---|---|---|---|---|---|---|---|
| 12345 | Jun 22 2022 | 123-RF456679 | $235.90 | $215.80 | 12349901 | ON | CoPay Exceeded | ○ Yes ● No |
| 19344 | Jun 22 2022 | 123-RF456679 | $235.90 | $215.80 | 12349668 | ON | CoPay Exceeded | ○ Yes ● No |
| 12345 | Jun 22 2022 | 123-RF456679 | $235.90 | $215.80 | 12349901 | ON | Duplicate, CoPay Exceeded | ○ Yes ● No |
| 12399 | May 22 2022 | 123-RF456679 | $199.90 | $99.80 | 12349901 | ON | Outside Period | ○ Yes ● No |
| 12345 | Jun 22 2022 | 123-RF456679 | $235.90 | $215.80 | | ON | Pharmacy ID Missing | ○ Yes ● No |

First Prev 1 2 3 Next Last

*FIG. 2A*

Completed Reviews > List

PSP FAAST v1.0 Production

Filter Records (showing 3 of 4,551)

Status: ▼   Vendor:

Date From: April 1 2022   Date To: June 30 2022

[ Clear Filters ]

| Vendor Name | CoPay Period | Total CoPay $ | # of CoPay Records | # of Failed Comparisons | Failed Item CoPay $Amt | CoPay File Status |
|---|---|---|---|---|---|---|
| ABC | May 15 2022 to June 14 2022 | $1,240,000 | 231 | 11 | $41,400 | Rejected |
| Company B | May 1 2022 to May 31 2022 | $76,500 | 67 | 1 | $37 | Approved |
| Company B | April 1 2022 to April 30 2022 | $1,129,120 | 89 | 0 | $0 | Auto-Approved |
|  |  |  |  |  |  |  |
|  |  |  |  |  |  |  |
|  |  |  |  |  |  |  |
|  |  |  |  |  |  |  |

First  Prev  1  2  3  Next  Last

Menu:
- Pending Reviews
- Completed Reviews
- Failed Imports
- Matching Rules
- User Profile
- System Setup

System Setup > Client Management > BPC

FSP FAAST v1.0 Production

| Client ID | Client Name | Status | Date Activated | Comments |
|---|---|---|---|---|
| BPC | Best Pharma Company | Active | Feb 1 2019 | |

Client Profile | Import Actions | Import Mappings

[Edit Profile]

Client ID: BPC (cannot be changed once created)
Client Name: Best Pharma Company
Status: Active
Client SFTP: xxx.xxx.xxx.xxx  SFTP ID: bpc_id  SFTP Password: ************
Email Distribution: person1@bpc.com; person2@bpc.com; maillist@bpc.com
Created Date: June 1 2020
Last Updated: June 28 2020

Menu
- Pending Reviews
- Completed Reviews
- Failed Imports
- Matching Rules
- User Profile
- System Setup
  - Access Management
  - Import Management
  - Client Management
  - Vendor Management
- System Lists
- User Roles
- Error Messages

APPARATUS AND METHOD FOR DATA DISCREPANCY IDENTIFICATION

FIELD OF THE INVENTION

The present invention generally relates to the field of data analysis. In particular, the present invention is directed to apparatus and method for data discrepancy identification.

BACKGROUND

Analyzing data can be difficult. Existing technologies do not adequately utilize data processing to leverage existing reference data in order to provide evaluation of data.

SUMMARY OF THE DISCLOSURE

In an aspect, an apparatus for data discrepancy identification is disclosed. The apparatus includes at least a processor and a memory communicatively connected to at least a processor, wherein the memory contains instructions configuring the at least a processor to authenticate a provider using a provider identifier, receive at least a record from the provider, wherein the at least a record includes a plurality of record elements, obtain at least a proof, wherein the at least a proof includes a plurality of proof elements, analyze the at least a record to find a data discrepancy, wherein analyzing further includes retrieving a discrepancy template and finding the data discrepancy of the at least a record as a function of the at least a proof and the discrepancy template, determine a discrepancy process as a function of the data discrepancy and update the at least a record as a function of the discrepancy process.

In another aspect, a method for data discrepancy identification is disclosed. The method includes authenticating, using at least a processor, a provider using a provider identifier, receiving, using the at least a processor, at least a record, wherein the at least a record includes a plurality of record elements, obtaining, using the at least a processor, at least a proof, wherein the at least a proof includes a plurality of proof elements, analyzing, using the at least a processor, the at least a record to find a data discrepancy, wherein analyzing further includes retrieving a discrepancy template and finding the data discrepancy of the at least a record as a function of the at least a proof and the discrepancy template, determining, using the at least a processor, a discrepancy process as a function of the data discrepancy and updating, using the at least a processor, the at least a record as a function of the discrepancy process.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 2A-D are illustrations of exemplary graphical user interface of a provider device;

Figure 1:
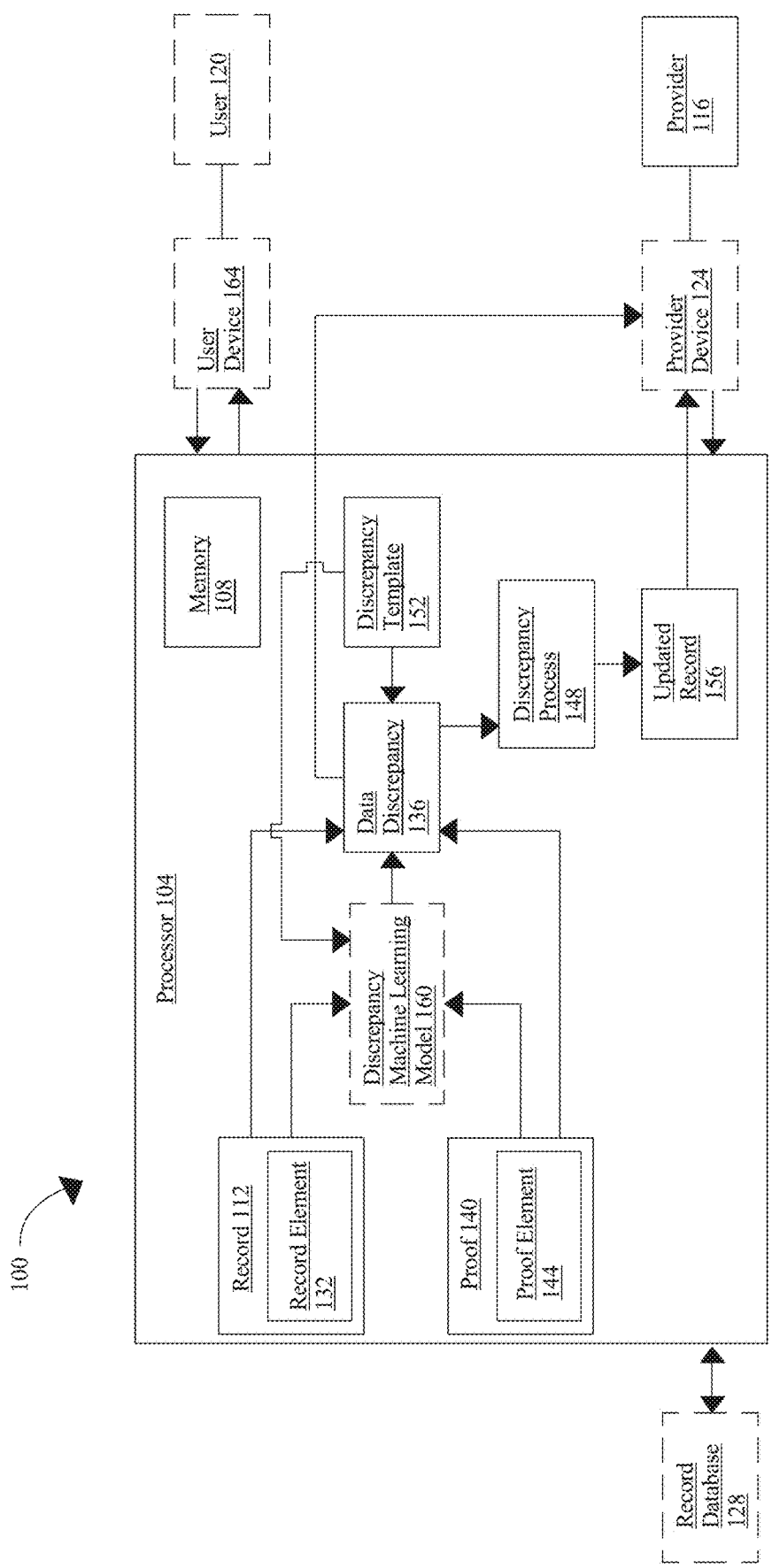
FIG. 1 illustrates a block diagram of an exemplary apparatus for data discrepancy identification.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for data discrepancy identification. The apparatus includes at least a processor and a memory communicatively connected to at least a processor, wherein the memory contains instructions configuring the at least a processor to authenticate a provider using a provider identifier, receive at least a record from the provider, wherein the at least a record includes a plurality of record elements, obtain at least a proof, wherein the at least a proof includes a plurality of proof elements, analyze the at least a record to find a data discrepancy, wherein analyzing further includes retrieving a discrepancy template and finding the data discrepancy of the at least a record as a function of the at least a proof and the discrepancy template, determine a discrepancy process as a function of the data discrepancy and update the at least a record as a function of the discrepancy process. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for data discrepancy identification is illustrated. Apparatus 100 includes processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive at least a record 112. For the purposes of this disclosure, a "record" is a document that is issued by a provider to a user. As a non-limiting example, record 112 may include an invoice, bank statement, organization account, inventory report, customer or client statement, copay statement, or the like thereof. For example, and without limitation, invoice may include service invoice, sales invoice, recurring invoice, proforma invoice, or the like. As another non-limiting example, record 112 may include physical record, electronic record, or the like. In some embodiments, record 112 may include a plurality of records 112. Persons skilled in the art, upon reviewing the entirety of this disclosure, may appreciate various records 112 that can be used in apparatus 100.

With continued reference to FIG. 1, for the purposes of this disclosure, a "provider" is an individual, group, company, or any entity that provides a service to a user. As a non-limiting example, provider 116 may include an information technology (IT) service provider, telecommunication service provider, healthcare service provider, financial service provider, transportation service provider, legal service provider, educational service provider, hospitality service provider, consulting service provider, cleaning service provider, personal care provider, hone repair service provider, advertising service provider, event planning service provider, catering service provider, fitness service provider, pet care service provider, photography and videography service provider, translation service provider, real estate service provider, occupational service provider, manufacturing service provider, and any service provider thereof. For example, and without limitation, healthcare service provider may include a hospital, pharmacy, doctor, nurse, pharmacist, physical therapist, caregiver, or the like. In some embodiments, provider 116 may be licensed in certain areas of service or jurisdictions. In some embodiments, provider 116 may include a plurality of providers 116. For the purposes of this disclosure, a "user" is an individual, group, company, or any entity that uses a service. As a non-limiting example, user 120 may include a patient, client, or the like. In some embodiments, user 120 may include a past user, current user, and the like. For the purposes of this disclosure, a "service" is an act or performance provided by a provider to a user. As a non-limiting example, the service may include legal services, healthcare services, financial services, consulting services, transportation services, educational services, entertainment services, travel services, cleaning services, maintenance services, fitness services, pet care services, real estate services, occupational services, manufacturing services, and any services thereof. In some embodiments, each of the service may include sub-services that may be more specific than general services. As a non-limiting example, the healthcare services may include diagnostic service, rehabilitative service, medicative service, supportive service, or the like. The example above merely shows exemplary sub-services for healthcare services, and various sub-services for other services may be appreciated by persons skilled in the art upon reviewing the entirety of this disclosure.

With continued reference to FIG. 1, processor 104 is configured to receive record 112 from provider 116. As a non-limiting example, provider 116 may manually input record 112 using a provider device 124. For example, and without limitation, provider 116 may input an online record using provider device 124. For example, and without limitation, provider 116 may scan record 112 and input the record 112 using provider device 124. For example, and without limitation, provider 116 may take a picture of record 112 and input the record 112 using provider device 124. For the purposes of this disclosure, a "provider device" is any device a provider uses to input data. As a non-limiting example, provider device 124 may include a laptop, tablet, smart phone, smart watch, desktop, or things of the like. As another non-limiting example, provider device 124 may include display, touch screen, mouse, keyboard, or the like. In some embodiments, provider device 124 may include an interface configured to receive inputs from provider 116 as described in detail below. In some embodiments, provider 116 may have a capability to process, store or transmit any information independently using provider device 124.

With continued reference to FIG. 1, in some embodiments, processor 104 may store record 112 in record database 128. In some embodiments, processor 104 may retrieve record 112 from record database 128. In some embodiments, apparatus 100 may include a record database 128. As used in this disclosure, "record database" is a data structure configured to store data associated with record. As a non-limiting example, record database 128 may store record 112, record element 132, data discrepancy 136, proof 140, proof element 144, discrepancy solution, solution template, discrepancy process 148, discrepancy template 152, updated record 156, or the like. In one or more embodiments, record database 128 may include inputted or calculated information and datum related to record 112. As a non-limiting example, record database may include comparison between record 112 and proof 140, relation between data discrepancy 136 and solution template, or the like. In some embodiments, a datum history may be stored in record database 128. As a non-limiting example, the datum history may include real-time and/or previous inputted data related to record 112. In one or more embodiments, record database 128 may include real-time or previously determined data related to record 112 as described above. As a non-limiting example, record database 128 may include instructions from provider 116, who may be an expert provider, a past provider in embodiments disclosed herein, or the like, where the instructions may include examples of the data related to record 112. In some embodiments, provider 116 or user 120 may trace any data in record database 128. As a non-limiting example, provider 116 or user 120 may trace any changes made within record 112. As another non-limiting example, provider 116 or user 120 may trace any changes made by provider 116.

With continued reference to FIG. 1, in some embodiments, processor 104 may be communicatively connected with record database 128. For example, and without limitation, in some cases, record database 128 may be local to processor 104. In another example, and without limitation, record database 128 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store record database 128. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, record database 128 may include keywords. As used in this disclosure, a "keyword" is an element of word or syntax used to identify and/or match elements to each other. For example, without limitation, keyword may include record number in the instance that provider 116 is looking for a specific record. As a non-limiting example, provider 116 may query record database 128 for certain information using keyword. In another non-limiting example, keyword may include a name of user 120 in an example provider 116 is looking for a specific user 120. In another non-limiting example, keyword may include a name of service or product in the instance that provider 116 is looking for a specific service or product.

With continued reference to FIG. 1, in some embodiments, record database 128 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, record 112 includes a plurality of record elements 132. For the purposes of this disclosure, a "record element" is an element of information that is within a record. In some embodiments, record element 132 may include a numerical value. In some embodiments, record element 132 may include a string that contains at least a word. In an embodiment, record element 132 may include a record number. For the purposes of this disclosure, a "record number" is a unique identifier assigned to a record. In another embodiment, record element 132 may include date of issue, date of service used or product purchased, amount of service or product used or ordered, additional charge, subtotal, tax, total amount due, payment terms, payment instruction, terms and conditions, product or service identification (ID) number, copay amount, or the like. In another embodiment, record element 132 may include provider information. For the purposes of this disclosure, "provider information" is information related to a provider and provider's service. As a non-limiting example, provider information may include a name of provider 116, provider identification (ID) number, address of provider 116, contact information of provider 116, name of service or product, price of service or product, description of service or product, rate, or the like. In another embodiment, provider information may include user information. For the purposes of this disclosure, "user information" is user's personal information. As a non-limiting example, user information may include a name of user 120, user identification (ID) number, gender, address of user, contact information of user 120, payment information, and the like. For example, and without limitation, payment information may include card numbers, card security codes, the user 120's personal identification number (PIN) for the card, the card's expiration date, and the user 120's name on the card, or the like. In some embodiments, processor 104 may store record element 132 in record database 128. In some embodiments, processor 104 may retrieve record element 132 from record database 128. In some embodiments, provider 116 may manually input record element 132 using provider device 124.

With continued reference to FIG. 1, in some embodiments, processor 104 may analyze record 112 to find record element 132 using optical character recognition (OCR). For the purposes of this disclosure, an "optical character recognition" is a technology that enables the recognition and conversion of printed or written text into machine-encoded text. In some cases, processor 104 may be configured to recognize a keyword using the OCR to find the positive reputation data and the negative reputation data. In some cases, processor 104 may transcribe much or even substantially all record 112.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from record 112 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of record 112. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to record 112 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 3. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes record 112. Since the adaptive classifier may have learned something useful a little too late to recognize characters on the first pass, a second pass may be run over record 112. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, processor 104 may obtain record element 132 using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to scrape record element 132 from a provider 116's website, Software-as-a-Service (SaaS) platform, or the like. The web crawler may be seeded and/or trained with a reputable website to begin the search. A web crawler may be generated by processor 104. In some embodiments, the web crawler may be trained with information received from provider 116 through a user interface. The user interface disclosed herein is further described in detail below. In some embodiments, the web crawler may be configured to generate a web query. A web query may include search criteria received from provider 116. For example, provider 116 may submit a plurality of websites for the web crawler to search to record statistics from and correlate to record 112, record element 132, and the like. Additionally, the web crawler function may be configured to search for and/or detect one or more data patterns. A "data pattern" as used in this disclosure is any repeating forms of information. A data pattern may include repeating purchase or service use, and the like. In some embodiments, the web crawler may be configured to determine the relevancy of a data pattern. Relevancy may be determined by a relevancy score. A relevancy score may be automatically generated by processor 104, received from a machine learning model, and/or received from provider 116. In some embodiments, a relevancy score may include a range of numerical values that may correspond to a relevancy strength of data received from a web crawler function. As a non-limiting example, a web crawler function may search the Internet for record element 132 related to record 112, provider 116 or user 120.

With continued reference to FIG. 1, in some embodiments, memory 108 contains instructions configuring processor 104 to obtain at least a proof 140. For the purposes of this disclosure, a "proof" is a supporting document that serves as an evidence of information of a record. In some embodiments, proof 140 may be used to validate or verify accuracy or completeness of record 112. In a non-limiting example, proof 140 may include purchase orders, delivery receipts, contracts, service agreements, shipping documents, payment receipts, payment confirmations, work orders, service reports, internal approval document, budget allocation document, requisition forms, copay contract documents, or the like. As another non-limiting example, proof 140 may include physical record, electronic record, or the like. In a non-limiting example, proof 140 may include user document. For the purposes of this disclosure, "user document" is any document related to user's personal information. As a non-limiting example, user document may include social security card, driver license, passport, bank statements, credit card statements, tax documents, medical reports, insurance claims, prescription documents, marriage certificates, registration form, user profile, or the like. In another non-limiting example, proof 140 may include provider document. For the purposes of this disclosure, "provider document" is any document related to provider's personal information. As a non-limiting example, provider document may include business license, professional certification, tax identification document, invoice, billing statement, registration form, provider profile, or the like. In some embodiments, proof 140 may include record 112. As a non-limiting example, record 112 may include a first record 112 and proof 140 may include a second record 112, then processor 104 may compare the first record 112 and the second record 112 to find data discrepancy 136 in the first record 112. For example, and without limitation, the processor 104 may find a duplication between the first record 112 and the second record 112 as described below. Persons skilled in the art, upon reviewing the entirety of this disclosure, may appreciate various proofs 140 that can be used in apparatus 100. In some embodiments, proof 140 may include past proof 140 from previous iterations of processing. In some embodiments, proof 140 may be stored in record database 128. In some embodiments, proof 140 may be retrieved from record database 128. In some embodiments, processor 104 may receive proof 140 from provider 116.

With continued reference to FIG. 1, proof 140 includes a plurality of proof elements 144. For the purposes of this disclosure, a "proof element" is information that is enclosed within a proof. In some embodiments, proof element 144 may include a numerical value. In some embodiments, proof element 144 may include a string that contains at least a word. As a non-limiting example, proof element 144 may include a proof number. For the purposes of this disclosure, a "proof number" is a unique identifier assigned to a proof. As another non-limiting example, proof element 144 may include date of issue, date of service used or product purchased, amount of service or product used or ordered, additional charge, subtotal, tax, total amount due, payment terms, payment instruction, terms and conditions, product or service identification (ID) number, copay condition, copay amount, or the like. As another non-limiting example, proof element 144 may include provider information as described above. As another non-limiting example, proof element 144 may include user information as described above. As another non-limiting example, proof element 144 may be consistent with record element 132. In some embodiments, proof element 144 of proof 140 may be obtained from provider 116. As a non-limiting example, provider 116 may manually input proof element 144 using provider device 124. As another non-limiting example, processor 104 may retrieve proof element 144 from a user profile that provider 116 has created. As another non-limiting example, processor 104 may retrieve proof element 144 from a provider profile that provider 116 has created. In some embodiments, proof element 144 may include past proof element 144 from previous iterations of processing. In some embodiments, proof element 144 may be stored in record database 128. In some embodiments, proof element 144 may be retrieved from record database 128. In some embodiments, processor 104 may derive proof element 144 from proof 140 using OCR. The OCR disclosed herein is further described above. As a non-limiting example, processor 104 may analyze contracts of proof 140 to obtain payment terms of proof element 144. In some embodiments, processor 104 may device proof element 144 using web crawler. The web crawler disclosed herein is further described above. As a non-limiting example, web crawler may derive service and terms of proof element 144 from provider 116's website.

With continued reference to FIG. 1, memory 108 contains instructions further configuring processor 104 to analyze record 112 to find a data discrepancy 136. For the purposes of this disclosure, a "data discrepancy" is a difference or inconsistency between two or more sets of data or information. As a non-limiting example, data discrepancy 136 may indicate a lack of alignment or agreement between the expected or desired data (record element 132 in record 112) and the actual data (proof element 144 in proof 140) observed or recorded. As a non-limiting example, data discrepancy 136 may include data outlier, duplication, data inconsistency, missing value, formatting error, or the like. In some embodiments, data discrepancy 136 may be stored in record database 128. In some embodiments, data discrepancy 136 may be retrieved from record database 128. In some embodiments, provider 116 may manually find data discrepancy 136 in record 112. As a non-limiting example, provider 116 may manipulate a user interface of provider device 124 to find data discrepancy 136.

With continued reference to FIG. 1, for the purposes of this disclosure, a "data outlier" is a value of record element that deviates from a value of discrepancy template 152. As a non-limiting example, when discrepancy template 152 includes $400 to $500 for a specific product of provider 116 and 'price of product' of record element 132 includes $4500, then record 112 may include data outlier. The discrepancy template 152 disclosed herein is further described below.

With continued reference to FIG. 1, for the purposes of this disclosure, a "duplication" is existence of at least two identical values related to a record. As a non-limiting example, processor 104 may determine a first record 112 includes duplication when the first record 112 includes a record number that is same as a record number of a second record 112. As another non-limiting example, processor 104 may determine record 112 includes duplication when every record element 132 of a first record 112 includes same values as record elements 132 of a second record 112 or proof elements of proof 140.

With continued reference to FIG. 1, for the purposes of this disclosure, a "data inconsistency" is a state in which a value of record element in record is not consistent with a value of proof element of proof or a value of discrepancy template 152, where the record element and the proof element share a same keyword. As a non-limiting example, when transactional information of record element 132 in record 112 does not align with agreed-upon terms of proof element 144 in proof 140, processor 104 may determine the record 112 includes data inconsistency. As another non-limiting example, when a plurality of proof 140 includes service price, $40, of proof element 144 and record 112 includes service price, $400, of record element 132, processor 104 may determine the record 112 includes data inconsistency.

With continued reference to FIG. 1, for the purposes of this disclosure, a "missing value" is a state where a record does not contain data related to a certain record element. As another non-limiting example, when record 112 does not include a certain record element 132 while proof 140 includes a certain proof element 144 that includes a same keyword as the certain record element 132 or discrepancy template 152 includes a value related to the certain record element 132, processor 104 may determine that the record 112 includes missing value of data discrepancy 136. For example, and without limitation, when record 112 does not include a value for 'price of service' while proof 140 includes a value for 'price of service' proof element 144, processor 104 may determine the record 112 includes missing value. For example, and without limitation, when record 112 does not include a value for 'price of service' while discrepancy template 152 may include the value for 'price of service,' processor 104 may determine that the record 112 includes missing value of data discrepancy 136.

With continued reference to FIG. 1, for the purposes of this disclosure, a "formatting error" is a state where a record element 132 contains a format that does not align with a format of proof element. As a non-limiting example, when record 112 includes a record number of record element 132 in a format of XXXX-XXXX while proof 140 includes a proof number of record element 132 in a format of XXXXXXXX, processor 104 may determine the record 112 includes formatting error of data discrepancy 136.

With continued reference to FIG. 1, in some embodiments, processor 104 may analyze record 112 to find data discrepancy 136 as a function of proof 140. As a non-limiting example, processor 104 may compare record element 132 of record 112 and proof element 144 of proof 140 to find data discrepancy 136. For example, and without limitation, processor 104 may compare each of record elements 132 and proof elements 144 that includes matching keywords to find data discrepancy 136. As a non-limiting example, when record 112 and proof 140 includes record elements 132 and proof elements 144 that includes matching keywords, such as but not limiting to, 'tax,' 'total amount due,' 'additional charge,' 'price of service,' 'name of user 120,' 'address of user 120,' then processor 104 may compare each of the record elements 132 to the proof elements 144 to find data discrepancy 136 of them. For example, and without limitation, if 'tax' of record element 132 includes 6.25% and 'tax' of proof element 144 includes 6.25%, then record 112 may not include data discrepancy 136. For another example, and without limitation, if 'tax' of record element 132 includes 6.25% and 'tax' of proof element 144 includes 5.25%, then record 112 may include data inconsistency of data discrepancy 136.

With continued reference to FIG. 1, in some embodiments, processor 104 may compare record element 132 and proof element 144 by relating the record element 132 and the proof element 144 using keywords of the record element 132 and the proof element 144 that are derived using OCR. In some other embodiments, processor 104 may extract one or more words (keywords) from record 112 and/or proof 140 using a language processing module. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by processor 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating the language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, for example, and without limitation, processor 104 may use OCR or language processing model to identify keyword of record element 132 that includes 'name of user' and a keyword of proof element 144 that includes 'name of user,' then, as the keywords matches, the processor 104 may compare proof 140 and record 112 to find data discrepancy 136. In some embodiments, identifying keywords may further include classifying proof 140 that includes keyword of proof element 144 to record 112 that includes keyword of record element 132 as the keyword of the proof element 144 and the keyword of the record element 132 matches. Then, in a non-limiting example, processor 104 may compare proof element 144 of the proof 140 and record element 132 of the record 112 to determine data discrepancy 136.

With continued reference to FIG. 1, in some embodiments, processor 104 may include an element classifier to classify proof 140 to related record 112. In some embodiments, processor 104 may include data mapping. For the purposes of this disclosure, "data mapping" is a process of establishing a relationship or connection between a plurality of data. For the purposes of this disclosure, an "element classifier" is a machine learning model that sorts at least a proof into a record associated with the at least a proof. In some embodiments, element classifier may be trained with element training data correlating proof 140 with record 112. A "classifier," as used in this disclosure is a machine-learning model, such as a mathematical model, neural net, or program generated by a machine learning algorithm known as a "classification algorithm," as described in further detail below, that sorts of inputs into categories or bins of data, outputting the categories or bins of data and/or labels associated therewith. A classifier may be configured to output at least a datum that labels or otherwise identifies a set of data that are clustered together, found to be close under a distance metric as described below, or the like. In some embodiments, element classifier may be trained with element training data correlating proof 140 to related record 112 using a keyword of record element 132. For the purposes of this disclosure, "training data" is data containing correlations that a machine-learning process may use to model relationships between two or more categories of data elements. The training data disclosed herein is further disclosed with respect to FIG. 3. As a non-limiting example, element classifier may classify proof 140 that includes proof element 144 that is similar to record element 132 of record 112. For example, and without limitation, element classifier may match a keyword of record element 132 and a keyword of proof element 144 to classify proof 140 to related record 112.

With continued reference to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 104 analyzes record 112 to find data discrepancy 136 as a function of proof 140 and a discrepancy template 152. For the purposes of this disclosure, a "discrepancy template" is a predetermined record validation rule. In some embodiments, discrepancy template 152 may include a plurality of discrepancy templates 152. In some embodiments, discrepancy template 152 may include a predefined value for each of record element 132. In some embodiments, discrepancy template 152 may include a predefined rule for each type of data discrepancies 136. In some embodiments, discrepancy template 152 may include a prioritization to find a certain type of data discrepancy 136 over another. As a non-limiting example, discrepancy template 152 may include a predetermined rule to find duplication of data discrepancy 136, then data outlier of data discrepancy 136. In some embodiments, discrepancy template 152 may be stored in record database 128. In some embodiments, discrepancy template 152 may be retrieved from record database 128. In some embodiments, provider 116 may manually input discrepancy template 152. As a non-limiting example, provider 116 may add, modify or delete discrepancy template 152. In some embodiments, processor 104 may derive discrepancy template 152 from a provider 116's website using web crawler. In some embodiments, discrepancy template 152 may include past discrepancy template 152 from previous iterations of processing. In some embodiments, processor 104 may include statistical analysis that may detect outliers, unusual patterns or trends, or data inconsistencies of record 112. As a non-limiting example, statistical analysis may include mean imputation, regression imputations, k-nearest neighbor imputation, expectation-maximization (EM) algorithm, or the like.

With continued reference to FIG. 1, in an embodiment, discrepancy template 152 may include a numerical value. As a non-limiting example, discrepancy template 152 may include a predefined rule for duplication of data discrepancy 136. For example, and without limitation, discrepancy template 152 may include a predefined rule for duplication, where record 112 that includes record element 132 of user ID number, provider ID number and total amount of prescription (product) equivalent to proof element 144 of proof 140. Then, in a non-limiting example, processor 104 may determine that record 112 does not include duplication of data discrepancy 136 when the record 112 only includes record element 132 of user ID number and provider ID number equivalent to proof element 144 of proof 140. In another non-limiting example, the processor 104 may determine that record includes duplication of data discrepancy 136 when the record 112 includes record element 132 of user ID number, provider ID number and total amount of prescription equivalent to proof element 144 of proof 140. As another non-limiting example, discrepancy template 152 may include a predefined copay amount of '50% of prescription amount,' then processor 104 may determine record 112 includes data inconsistency when 'copay amount' of record element 132 of the record 112 does not match with the predefined copay amount. In another non-limiting example, discrepancy template 152 may include a predefined rule for copay amount, where the copay amount that is bigger than 50% of prescription amount is data outlier, then processor 104 may determine record 112 includes data outlier when 'copay amount' of record element 132 of the record 112 is bigger than the predefined rule. As another non-limiting example, discrepancy template 152 may include a predetermined tax rate for 'tax' of record element 132, then processor 104 may find data inconsistency of record 112 as a function of the discrepancy template 152, where the record element 132 does not match with the predetermined tax rate of discrepancy template 152. As another non-limiting example, discrepancy template 152 may include a predetermined range of prices of a specific product of provider 116, then processor 104 may find a data outlier of record 112 as a function of the discrepancy template 152 as described above, where a value of record element 132 deviates from the range of prices of discrepancy template 152. As another non-limiting example, discrepancy template 152 may include a specific range of date. For example, and without limitation, discrepancy template 152 may include a range of prescription (service) date, and when record 112 includes a prescription data that is out of the discrepancy template 152, processor 104 may determine the record 112 includes data outlier.

With continued reference to FIG. 1, in another embodiment, discrepancy template 152 may include a string containing at least a word. As a non-limiting example, discrepancy template 152 may include a predetermined format of record element 132, then processor 104 may determine that record 112 includes formatting error as a function of the discrepancy template 152, where a format of record element 132 of the record 112 does not match with the predetermined format of record element 132. For example, and without limitation, discrepancy template 152 may include predefined format of prescription (service) date as 'mm/dd/yyyy.' Then, in a non-limiting example, when record 112 includes a format of prescription data as 'yyyy/mm/dd,' processor 104 may determine the record 112 includes formatting error. As another non-limiting example, discrepancy template 152 may include a predetermined provider 116's address, then processor 104 may determine that record 112 includes data inconsistency as a function of the discrepancy template 152, where provider 116's address of the record 112 does not match with the predetermined provider 116's address of the discrepancy template 152.

With continued reference to FIG. 1, in some embodiments, processor 104 may find data discrepancy 136 using a discrepancy machine learning model 160. For the purposes of this disclosure, a "discrepancy machine learning model" is a machine learning model that finds a data discrepancy of a record. In some embodiments, discrepancy machine learning model 160 may be consistent with a machine learning model described with respect to FIG. 3. In some embodiments, discrepancy machine learning model 160 may be trained with discrepancy training data. For the purposes of this disclosure, "discrepancy training data" is training data that is used to train a discrepancy machine learning model. The discrepancy training data disclosed herein may be consistent with training data described with respect to FIG. 3. In some embodiments, the discrepancy training data may be received from one or more providers 116, record database 128, external computing devices, and/or previous iterations of processing. As a non-limiting example, the discrepancy training data may include instructions from provider 116, who may be an expert provider, a past provider in embodiments disclosed herein, or the like, which may be stored in memory and/or stored in record database 128, where the instructions may include labeling of training examples.

With continued reference to FIG. 1, in some embodiments, discrepancy machine learning model 160 may be trained with discrepancy training data that correlates a record data set and proof data set and output data discrepancy 136 of the record data set. As a non-limiting example, discrepancy machine learning model 160 may be trained with discrepancy training data set that correlates record element 132 of record 112 and proof element 144 of proof 140, where the correlation of the record element 132 and the proof element 144 shows data inconsistency of data discrepancy 136. In a non-limiting example, discrepancy machine learning model 160 that is trained with the discrepancy training data set may receive a plurality of record 112 and proof 140 as input, then find and output data inconsistency of records 112. In some embodiments, discrepancy training data may correlate a record data set and a discrepancy template data set and output data discrepancy 136 of the record data set. As a non-limiting example, discrepancy machine learning model 160 may be trained with discrepancy training data set that correlates a plurality of record elements 132 related to 'tax' and a predetermined tax rate, where the correlation of the plurality of record elements 132 and the predetermined tax rate shows data inconsistency. In a non-limiting example, discrepancy machine learning model 160 that is trained with the discrepancy training data set may receive record 112 as input, then find and output data inconsistency of the record 112. As another non-limiting example, discrepancy machine learning model 160 may be trained with discrepancy training data set that correlates a plurality of record elements 132 to a predetermined rule for duplication, where the correlation of the plurality of record elements 132 and the predetermined rule shows duplication of data discrepancy 136. In a non-limiting example, discrepancy machine learning model 160 that is trained with the discrepancy training data set may receive record 112 as input, then find and output duplication of the record 112. The examples above show processor 104 determining data inconsistency of data discrepancy 136 of record 112 using discrepancy machine learning model 160 merely as an example, and persons skilled in the art, upon reviewing the entirety of this disclosure may appreciate that discrepancy machine learning model 160 can be used to determine data outlier, duplication, formatting error or missing value of record 112 as well.

With continued reference to FIG. 1, in some embodiments, processor 104 may classify data discrepancy 136 into one or more data discrepancy groups. For the purposes of this disclosure, a "data discrepancy group" is a set of associative data discrepancies. As a non-limiting example, data discrepancy group may include a data outlier, duplication, data inconsistency, missing value, formatting error group, or the like. In a non-limiting example, as processor 104 determines data discrepancy 136 in record 112, the processor 104 may classify the data discrepancy 136 to related data discrepancy group. For example, and without limitation, data outlier of data discrepancy 136 may be classified into a data outlier group. For example, and without limitation, data inconsistency of data discrepancy 136 may be classified into a data discrepancy group. In some embodiments, data discrepancy group may be stored in record database 128. In some embodiments, data discrepancy group may be retrieved from record database 128.

With continued reference to FIG. 1, in some embodiments, processor 104 may classify data discrepancy 136 into one or more data discrepancy groups using a discrepancy group classifier. For the purposes of this disclosure, a "discrepancy group classifier" is a machine learning model that sorts data discrepancies into data discrepancy groups. The discrepancy group classifier disclosed herein may be consistent with any classifiers described in the entirety of this disclosure. In some embodiments, discrepancy group classifier may be trained with discrepancy group training data. For the purposes of this disclosure, "discrepancy group training data" is training data that is used to train discrepancy group classifier. The discrepancy group training data disclosed herein may be consistent with any training data described in the entirety of this disclosure. In some embodiments, in some embodiments, discrepancy group training data may correlate data discrepancies to data discrepancy groups. As a non-limiting example, discrepancy group training data may correlate data outliers to data outlier groups. As another non-limiting example, discrepancy group training data may correlate data inconsistencies to data inconsistency groups. As another non-limiting example, discrepancy group training data may correlate duplications to duplication groups. As another non-limiting example, discrepancy group training data may correlate formatting errors to formatting error groups. As another non-limiting example, discrepancy group training data may correlate missing values to missing value groups. In some embodiments, discrepancy group training data may be received from one or more providers, record database 128, external computing devices, and/or previous iterations of processing. As a non-limiting example, discrepancy group training data may include instructions from a provider, who may be an expert provider, a past provider in embodiments disclosed herein, or the like, which may be stored in memory and/or stored in the record database 128, where the instructions may include labeling of training examples. In some embodiments, discrepancy group classifier may be trained to learn from past examples, and may adjust its predictions over time as new data becomes available.

With continued reference to FIG. 1, memory 108 contains instructions configuring processor 104 to determine a discrepancy process 148 as a function of data discrepancy 136. In a non-limiting example, processor 104 may determine discrepancy process 148 as a function of data discrepancy 136 in data discrepancy group. As a non-limiting example, once processor 104 finds data discrepancy 136, the processor 104 may determine discrepancy process 148 for the data discrepancy 136. For the purposes of this disclosure, a "discrepancy process" is a systemic order of action utilized to address a data discrepancy within a record. The discrepancy process disclosed herein is further described below. Memory 108 contains instructions configuring processor 104 to update record 112 as a function of discrepancy process 148. As a non-limiting example, when processor 104 determines discrepancy process 148 to automatically update record 112 using discrepancy solution, processor 104 may make change in the record 112 using the discrepancy solution and update the record 112. As another non-limiting example, when processor 104 determines discrepancy process 148 to transmit data discrepancy 136 of record 112 to provider 116, processor 104 may transmit the data discrepancy 136 to provider device 124 and receive a provider response for the transmitted data discrepancy 136. Then, in a non-limiting example, processor 104 may make change in the record 112 and update the record 112. The provider response disclosed herein is further described below. In some embodiments, discrepancy process 148 may be stored in record database 128. In some embodiments, discrepancy process 148 may be retrieved from record database 128. In some embodiments, provider 116 and/or user 120 may trace changes in record 112.

With continued reference to FIG. 1, in an embodiment, discrepancy process 148 may include automatically updating record 112 using a discrepancy solution. As a non-limiting example, processor 104 may automatically update record 112 using discrepancy solution. For example, and without limitation, processor 104 may remove, edit or add data of record element 132 of record 112. In some embodiments, memory 108 may contain instructions further configuring processor 104 to generate discrepancy solution. For the purposes of this disclosure, a "discrepancy solution" is a method to resolve a data discrepancy within a record, ensuring accuracy and integrity of the record. In some embodiments, discrepancy solution may include past discrepancy solution from previous iterations of processing. In some embodiments, discrepancy solution may be stored in record database 128. In some embodiments, discrepancy solution may be retrieved from record database 128. In some embodiments, changes made with discrepancy solution may be stored in record database 128. As a non-limiting example, provider 116 and/or user 120 may trace changes made within record 112.

With continued reference to FIG. 1, in an embodiment, discrepancy solution may include a data removal of data discrepancy 136. For the purposes of this disclosure, a "data removal" is the elimination of at least a record element from record to resolve a data discrepancy. As a non-limiting example, when record 112 includes duplication, where a plurality of record elements 132 includes the same information with proof elements 144 of proof 140, processor 104 may remove the plurality of record elements 132 from the record 112 (data removal). In another non-limiting example, the processor 104 may remove the entirety of the record 112 (data removal).

With continued reference to FIG. 1, in another embodiment, discrepancy solution may include a data modification. For the purposes of this disclosure, a "data modification" is modifying a record element in a record to resolve a data discrepancy. As a non-limiting example, when record 112 includes data outlier of record element 132, processor 104 may modify a value of the record element 132 to match with proof element 144 of proof 140 that was compared with the record 112 (data modification). In another non-limiting example, the processor 104 may modify the value of the record element 132 to match with discrepancy template 152, which was used to identify the data outlier of the record 112 (data modification). As another non-limiting example, when record 112 includes data inconsistency of record element 132, processor 104 may modify a value of the record element 132 to match with proof element 144 of proof 140 or discrepancy template 152 that was compared with the record 112 (data modification). As another non-limiting example, when record 112 includes formatting error or record element 132, processor 104 may modify a format of the record element 132 to match with proof element 144 of proof 140 or discrepancy template 152 that was compared with the record 112 (data modification).

With continued reference to FIG. 1, in another embodiment, discrepancy solution may include a data addition. For the purposes of this disclosure, a "data addition" is inputting additional data for a record element of a record to resolve a data discrepancy. As a non-limiting example, when record 112 includes a missing value of record element 132, processor 104 may input a new information to resolve data discrepancy 136 (data addition). In a non-limiting example, the new information can be proof element 144 of proof 140 or discrepancy template 152 that is used to be compared with the record 112.

With continued reference to FIG. 1, in some embodiments, discrepancy solution may include a non-discrepancy filter. For the purposes of this disclosure, a "non-discrepancy filter" is a predetermined rule for an exception for a data discrepancy of record element of a record. As a non-limiting example, record 112 may initially appear to include data discrepancy 136 but processor 104 may determine the data discrepancy 136 to be a non-discrepancy as a function of non-discrepancy filter. For example, and without limitation, non-discrepancy filter may include a predetermined rule for data inconsistency that if record element 132 is inconsistent with proof element 144 (data discrepancy 136) but consistent with discrepancy template 152 (non-discrepancy filter), then processor 104 may determine record element 132 does not include data inconsistency. For example, and without limitation, non-discrepancy filter may include a predetermined rule that if record element 132 includes data outlier but provider response includes to make an exception to data outlier, then processor 104 may determine that record 112 does not include data outlier. In some embodiments, non-discrepancy filter may include provider response. As a non-limiting example, processor 104 may identify duplication of record 112 and prompted provider 116 to review the record 112 (discrepancy process to transmit data discrepancy 136 to provider 116). If, in a non-limiting example, provider 116 input provider response that the duplication of the record 112 is not data discrepancy 136, then processor 104 may not update record 112 to modify the record 112 to solve data discrepancy 136. The provider response disclosed herein is further described below. The examples above are merely examples and persons skilled in the art, upon reviewing the entirety of this disclosure, may appreciate various non-discrepancy filters that can be used for discrepancy solution. In some embodiments, processor 104 may be configured to receive non-discrepancy filter. As a non-limiting example, processor 104 may receive non-discrepancy filter from provider 116. For example, and without limitation, provider 116 may manually input, modify or delete non-discrepancy filter. In some embodiments, processor 104 may update record 112 as a function of non-discrepancy filter. In some embodiments, non-discrepancy filter may be stored in record database 128. In some embodiments, non-discrepancy filter may be retrieved from record database 128.

With continued reference to FIG. 1, in some embodiments, provider 116 may manually input discrepancy solution for each of data discrepancies 136. For example, and without limitation, provider 116 may input data removal for duplication, data modification for data outlier, data inconsistency or formatting error or data addition for missing value.

With continued reference to FIG. 1, in some embodiments, processor 104 may derive new information (record element 132) that can be added (data addition of data solution) for missing value of record element 132 using web crawler. The web crawler disclosed herein is further described above. In some embodiments, processor 104 may generate a web crawler to scrape record element 132 for data addition from a provider 116's website, Software-as-a-Service (SaaS) platform, or the like. As a non-limiting example, a web crawler function may search the Internet for record element 132 for data addition. In some embodiments, web crawler may be configured to determine relevancy of missing value or record 112 and new record element 132 for the record 112 for data addition. In some embodiments, relevancy may be determined by a relevancy score. A relevancy score may be automatically generated by processor 104, received from a machine learning model, and/or received from provider 116. In some embodiments, a relevancy score may include a range of numerical values that may correspond to a relevancy strength of data received from a web crawler function. In some embodiments, processor 104 then determine new record element 132 for data addition of data solution as a function of relevancy score.

With continued reference to FIG. 1, in some embodiments, processor 104 may generate discrepancy solution as a function of data discrepancy 136 using a solution machine learning model. For the purposes of this disclosure, a "solution machine learning model" is a machine learning model that generates discrepancy solution for a data discrepancy. In some embodiments, solution machine learning model may be consistent with a machine learning model described with respect to FIG. 3. In some embodiments, solution machine learning model may be trained with solution training data. For the purposes of this disclosure, "solution training data" is training data that is used to train a solution machine learning model. The solution training data disclosed herein may be consistent with training data described with respect to FIG. 3. In some embodiments, solution training data may be received from one or more providers 116, record database 128, external computing devices, and/or previous iterations of processing. As a non-limiting example, solution training data may include instructions from provider, who may be an expert provider, a past provider in embodiments disclosed herein, or the like, which may be stored in memory and/or stored in record database 128, where the instructions may include labeling of training examples.

With continued reference to FIG. 1, in some embodiments, solution machine learning model may be trained with a solution training data set that correlates data discrepancy 136 to discrepancy solution. As a non-limiting example, solution training data set may correlate data outlier to discrepancy solution of modifying the data outlier using proof 140 and/or discrepancy template 152 (data modification). In a non-limiting example, solution machine learning model that is trained with the solution training data set may receive record 112 that includes data outlier and proof 140 and/or discrepancy template 152 as inputs and may output data modification of the record 112 by modifying the data outlier of the record using the proof 140 and/or discrepancy template 152. As another non-limiting example, solution training data set may correlate data inconsistency to discrepancy solution of modifying the data inconsistency using proof 140 and/or discrepancy template 152 (data modification). As another non-limiting example, solution training data set may correlate formatting error to discrepancy solution of modifying the formatting error using proof 140 and/or discrepancy template 152 (data modification). As another non-limiting example, solution training data set may correlate duplication to discrepancy solution of removing the duplication of record 112 (data removal). As another non-limiting example, solution training data set may correlate duplication of record 112 to discrepancy solution of removing the whole record 112 (data removal). In a non-limiting example, solution machine learning model that is trained with the solution training data set may receive record 112 that includes duplication as an input and may output data removal of the whole record 112. As another non-limiting example, solution training data set may correlate missing value to discrepancy solution of adding information into record using proof 140 and/or discrepancy template 152 (data addition). In a non-limiting example, solution machine learning model that is trained with the solution training data set may receive record 112 that includes missing value and proof 140 and/or discrepancy template 152 as inputs and may output data addition of information from proof 140 and/or discrepancy template 152.

With continued reference to FIG. 1, in another embodiment, discrepancy process 148 may include transmitting data discrepancy 136 to provider 116. As a non-limiting example, processor 104 may transmit data discrepancy 136 to provider device 124. In some embodiments, processor 104 may generate a user interface to display data discrepancy 136 on provider device 124. For the purposes of this disclosure, a "user interface" is a means by which a provider and/or user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with provider 116 and/or user 120. For example, provider 116 and/or user 120 may interact with user interface. In an embodiment, user interface may include a graphical user interface. A "graphical user interface," as used herein, is a graphical form of user interface that allows a provider and/or user to interact with electronic devices. In some embodiments, GUI may include icons, menus, other visual indicators or representations (graphics), audio indicators such as primary notation, and display information and related user controls. A menu may contain a list of choices and may allow provider 116 and/or user 120 to select one from them. A menu bar may be displayed horizontally across the screen such as pull-down menu. When any option is clicked in this menu, then the pull-down menu may appear. A menu may include a context menu that appears only when provider 116 and/or user 120 performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in some cases, processor 104 may flag or highlight data discrepancy 136 of record 112. For the purposes of this disclosure, "flagging" refers to the act of marking or indicating a specific record element of a record for further attention or action. In some embodiment, processor 104 may prompt provider 116 to input the necessary information, modify, or review the record 112 (provider response). In some embodiments, processor 104 may prompt user 120 to inform the user 120 about data discrepancy 136 of record 112. In some embodiments, processor 104 may prompt provider 116 to upload record 112 or proof 140. As a non-limiting example, processor 104 may prompt provider 116 or user 120 by sending an email, text message, call, banner, sound, vibration, prompt, form, or the like. For example, and without limitation, processor 104 may guide provider 116 through a series of prompts or forms, allowing provider 116 to enter, modify or delete record element 132 of record 112. Additionally or alternatively, processor 104 may provide options for modifying record 112. As a non-limiting example, processor 104 may provide or display discrepancy solution to provider 116. In some embodiments, processor 104 may receive a provider response of data discrepancy 136 from provider 116. As a non-limiting example, provider 116 may input provider response using provider device 124. In some embodiments, processor 104 may update record 112 as a function of provider response. For the purposes of this disclosure, a "provider response" is provider's input related to a record. As a non-limiting example, provider response may include any input from provider device 124 for reviewing, modifying, adding or deleting record element 132 of record 112. As another non-limiting example, provider response may include any input from provider device 124 for uploading record 112 or proof 140, reviewing issues related to updated record 156 or proof 140, or the like. As another non-limiting example, provider response may include any input from provider device 124 for inputting, modifying, reviewing, or deleting discrepancy template 152. As another non-limiting example, provider response may include any input from provider device 124 for inputting, editing, reviewing, or deleting user profile or provider profile. In some embodiments, provider response may be stored in record database 128. In some embodiments, provider response may be retrieved from record database 128.

With continued reference to FIG. 1, in some embodiments, processor 104 may determine discrepancy process 148 using a process template. For the purposes of this disclosure, a "process template" is a predetermined rule of discrepancy process. As a non-limiting example, process template may include a predetermined rule for discrepancy process 148 to automatically update every data discrepancy 136 of record 112 of a specific provider 116. As another non-limiting example, process template may include a predetermined rule for discrepancy process 148 to transmit every data discrepancy of record 112 of a specific provider 116 to the specific provider 116. As another non-limiting example, process template may include a predetermined rule for discrepancy process 148 to automatically update a specific type of data discrepancy 136 and transmit the other type of data discrepancy 136 to provider 116. For example, and without limitation, process template may include a predetermined rule for discrepancy process 148 to automatically update duplication, formatting error and missing value of record 112 and transmit data outlier and data inconsistency to provider 116 to review. As another non-limiting example, process template may include a predetermined rule for discrepancy process to automatically update every data discrepancy 136 but for data removal, specifically, processor 104 may delete record element 132 or record 112 after transmitting to provider 116 and getting an approval for data removal. The example disclosed herein is merely an example, and persons skilled in the art, upon reviewing the entirety of this disclosure, may appreciate various process templates that can be used for discrepancy process 148. In a non-limiting example, processor 104 may determine which process template to apply to which data discrepancy 136 to determine discrepancy process 148 as a function of data discrepancy group. For example, and without limitation, processor 104 may apply process template for duplication of data discrepancy 136 to data discrepancies 136 in duplication group of data discrepancy group. For example, and without limitation, processor 104 may apply process template for data removal and/or data inconsistency of data discrepancy 136 to data discrepancies 136 in data removal group and/or data inconsistency group of data discrepancy group. In some embodiments, process template may include past process template that is from previous iterations of processing. In some embodiments, provider 116 may manually input process template. As a non-limiting example, provider 116 may edit, delete or add process template using provider device 124. In some embodiments, process template may be stored in record database 128. In some embodiments, processor template may be retrieved from record database 128.

With continued reference to FIG. 1, in some embodiments, processor 104 may transmit an updated record 156 to user 120. For the purposes of this disclosure, an "updated record" is a record that is modified or approved for accuracy or integrity of record. As a non-limiting example, updated record 156 may include record 112 that is modified through an automatic update of discrepancy process 148 using discrepancy solution. As another non-limiting example, updated record 156 may include record 112 that is modified through provider 116's modification of discrepancy process 148 using provider response. In some embodiments, processor 104 may transmit data discrepancy 136 to user 120. As a non-limiting example, user 120 may review data discrepancy 136 of record 112. As another non-limiting example, user 120 may review data discrepancy 136 of updated record 156 that is modified or approved. In some embodiments, processor 104 may prompt user 120 or provider 116 once updated record 156 is generated.

With continued reference to FIG. 1, in some embodiments, processor 104 may generate user interface displaying updated record 156 or data discrepancy 136 on user device 164. The user interface disclosed herein is further described above. For the purposes of this disclosure, a "user device" is any device a user uses to input data. In some embodiments, user device 164 may be consistent with provider device 124. As a non-limiting example, user device 164 may include a laptop, tablet, smart phone, smart watch, desktop, or things of the like. As another non-limiting example, user device 164 may include display, touch screen, mouse, keyboard, or the like. In some embodiments, user device 164 may include an interface configured to receive inputs from user 120. In some embodiments, user 120 may have a capability to process, store or transmit any information independently using user device 164. As a non-limiting example, processor 104 may display a list of records 112 that needs to be reviewed by provider 116, list of data discrepancy 136 that needs to be reviewed by provider 116, list of updated record 156, list of records 112 that have failed to be uploaded or transmitted to processor 104, list of discrepancy templates 152, user profile, provider profile, list of providers 116, list of users 120, list of record elements 132, list of proof elements 144, or the like using user interface to provider 116 or user 120.

With continued reference to FIG. 1, in some embodiments, processor 104 may receive a user response from user device 164. For the purposes of this disclosure, a "user response" is any input from a user related to an updated record. In some embodiments, user response may include an approval. For the purposes of this disclosure, an "approval" is the act of accepting an updated record. As a non-limiting example, inputting approval of user response may indicate that user 120 has reviewed updated record 156 and agreed with information in the updated record 156. For example, and without limitation, inputting approval of user response may indicate that user 120 agrees total amount to pay, terms and condition, user information, provider information, or the like of updated record 156. Then, in a non-limiting example, user 120 may make a payment for updated record 156. In some embodiments, processor may include a set of Application Programming Interfaces (APIs) configured for processing online payment. APIs may include a third-party (3rd party) payment processing APIs. As another non-limiting example, payment processing platform may include PAYPAL, STRIPE, SQUARE, AUTHORIZE.NET, VENMO, or the like. In some embodiments, user response may include a rejection. For the purposes of this disclosure, a "rejection" is the act of refusing to accept an updated record. As a non-limiting example, inputting rejection of user response may indicate that user 120 has reviewed updated record 156 and does not agree with information in the updated record 156. For example, and without limitation, inputting rejection of user response may indicate that user 120 does not agree total amount to pay, terms and condition, user information provider information, or the like of updated record. In some embodiments, when processor 104 receives rejection for a first updated record 156, then the processor 104 may transmit the first updated record 156 to provider 116 to review or modify. After the review or modification, in a non-limiting example, the processor 104 may transmit a second updated record 156 (reviewed or modified updated record 156) to user 120. In some embodiments, user response may be stored in record database 128. In some embodiments, user response may be retrieved from record database 128.

With continued reference to FIG. 1, in some embodiments, processor 104 may include implementation of cloud computing. As used in this disclosure, "cloud computing" is an on-demand delivery of information technology (IT) resources within a network through internet, without direct active management by either provider or user. In an embodiment, without limitation, cloud computing may include a Software-as-a-Service (SaaS). As used in this disclosure, a "Software-as-a-Service" is a cloud computing service model which make software available to apparatus 100 directly; for instance, SaaS may deliver ready-to-use software applications over the network, accessible via internet applications (e.g., web browsers or specialized client applications). As a non-limiting example, SaaS may include SaaS for invoice reconciliation. As another non-limiting example, SaaS may include patient support program (PSP). In some embodiments, processor 104 may be configured to generate an application programming interface (API). As used herein, an "application programming interface" is a set of functions that allow applications to access data and interact with external software components, operating systems, or microdevices, such as another web application or computing device. In some embodiments, processor 104 may include implementation of secure file transfer protocol (SFTP). For the purposes of this disclosure, "secure file transfer protocol" is a network protocol that enables the secure transfer of files over a secure shell encryption to provide a high level of security for sending and receiving file transfers.

With continued reference to FIG. 1, memory 108 contains instructions configuring processor 104 to authenticate provider 116 using a provider identifier. For the purposes of this disclosure, a "provider identifier" is a datum representing an identity, attribute, code, and/or characteristic specific to a provider and/or provider device. For example, and without limitation, the provider identifier may include a username and password unique to provider 116 and/or provider device 124. The username and password may include any alphanumeric character, letter case, and/or special character. In some embodiments, processor 104 may be configured to receive a user identifier from user 120 or user device 164. For the purposes of this disclosure, a "user identifier" is a datum representing an identity, attribute, code, and/or characteristic specific to a user and/or user device. The user identifier may be consistent with provider identifier. In some embodiments, processor 104 may generate a login portal for provider 116 or user 120 to submit provider identifier or user identifier. In some embodiments, processor 104 may be configured to provider identifier or user identifier, compare the provider identifier or user identifier to an authorized provider identifier or user identifier stored within an authentication database, and bypass authentication provider 116, provider device 124, user 120 or user device 164 based on the comparison of the provider identifier or user identifier to the authorized provider identifier or user identifier stored within the authentication database. For the purposes of this disclosure, an "authentication database" is a data structure configured to store data associated with provider identifier and user identifier. In a non-limiting embodiment, processor 104 may transmit data discrepancy 136, record 112 or updated record 156 to user device 164 or provider device 124 when user identifier or provider identifier has been verified. In a non-limiting embodiment, processor 104 may manipulate data to be displayed to provider 116 or user 120 with varying authority. In some embodiments, processor 104 may incorporate priority classifiers used to classify low, average, and high classification of authorized user 120 and/or provider 116. For instance, user 120 and/or provider 116 with a lower priority classification may be a client, patient, and the like thereof. As a non-limiting example, user 120 or provider 116 with lower priority classifications detected by processor 104 may allow a limited amount of information to be displayed to user device 164 or provider device 124 for viewing by user 120 or provider 116 with lower priority classification. As another non-limiting example, user 120 and/or provider 116 with average priority classification may be an administrator, and the like thereof. As another non-limiting example, user 120 or provider 116 with average priority classifications detected by processor 104 may allow a limited amount of information but more than ones with lower priority classification to be displayed to user device 164 or provider device 124 for viewing by user 120 or provider 116 with average priority classification. As another non-limiting example, user 120 or provider 116 with higher priority classifications detected by processor 104 may allow a robust amount of information to be displayed to user device 164 or provider device 124 for viewing by user 120 or provider 116 with higher priority classification. Person of ordinary skill in the art, after viewing the entirety of this disclosure, would appreciate the various amount of information allowed to be viewed for different levels of authority.

With continued reference to FIG. 1, in an embodiment, record 112 or updated record 156 may be read-only. In another embodiment, record 112 or updated record 156 may be writable. In some embodiments, writable record 112 or updated record 156 may require authentication; for instance without limitation, writable record 112 or updated record may be writable only given provider identifier or user identifier with higher priority classification indicating that provider 116 or user 120 modifying the record 112 or updated record 156 is authorized. In some embodiments, record 112 or updated record 156 may include any combination of the above; for instance without limitation, record 112 or updated record 156 may include a read-only section. For example without limitation, record 112 or updated record 156 may include a writable section with limited access. In some embodiments, record 112 or updated record 156 may include a writable section with general access, to which any user may be able to input data. Record 112 or updated record 156 may include read-only section and generally writable section, or limited access writable section and generally writable section, or read-only section and limited access section. The limited access section may be limited to users 120 or providers 116 with lower or average priority classification. In another embodiment, record 112 or updated record 156 may be writable. In some embodiments, writable record 112 or updated record 156 may require authentication; for instance without limitation, writable record 112 or updated record 156 may be writable only given provider identifier or user identifier indicating that modifying record 112 or updated record 156 is authorized. In some embodiments, record 112 or updated record 156 may include any combination of the above; for instance without limitation, record 112 or updated record 156 may include a read-only section. For example without limitation, record 112 or updated record 156 may include a writable section with limited access. In some embodiments, record 112 or updated record 156 may include a writable section with general access, to which any user 120 or provider 116 may be able to input data. Record 112 or updated record 156 may include read-only section and generally writable section, or limited access writable section and generally writable section, or read-only section and limited access section. Limited access section may be limited to users 120 or provider 116 who may have provider identifier or user identifier with lower or average priority classification. In some embodiments, preventing user 120 or provider 116 from being able to write over record 112 or updated record 156 enables record 112 or updated record 156 to be free from intentional or unintentional corruption or inaccuracy, and enables apparatus 100 to ensure that certain information is always available to user 120 or provider 116. In some embodiments, writable sections enable apparatus 100 itself or user 120 or provider 116 to correct, augment, or update information as described in further detail below.

With continued reference to FIG. 1, in some embodiments, processor 104 may be configured to generate a completion datum for provider 116. For the purposes of this disclosure, a "completion datum" is a data element representing completion of analyzing a record for data discrepancy. In some embodiments, processor 104 may generate completion datum weekly, monthly, bi-monthly, quarterly, yearly, or the like. In other words, in a non-limiting example, processor 104 may analyze record 112 to find data discrepancy 136 weekly, monthly, bi-monthly, quarterly, yearly, or the like. In some embodiments, completion datum may be stored in record database 128. In some embodiments, completion datum may be retrieved from record database 128. In some embodiments, completion datum may be stored in immutable sequential listing. In some embodiments, completion datum may be retrieved from immutable sequential listing. In some embodiments, apparatus 100 may include a digital port enabling provider 116 to connect a digital wallet to immutable sequential listing. A "digital wallet," as used in this disclosure, is a software-based system that securely stores a provider's payment information and passwords for numerous payment methods and websites. By using a digital wallet, provider 116 may complete purchases easily and quickly with near-field communications technology. Immutable sequential listing disclosed herein is further described with respect to FIG. 7. In some embodiments, processor 104 may transmit completion datum to provider 116. Then, in a non-limiting example, provider 116 may pay a total amount of fee. In some embodiments, completion datum may include fee information. For the purposes of this disclosure, "fee information" is information related to a fee which a provider has to pay in return for using an apparatus 100. In some embodiments, fee may include annual, monthly, weekly fee, or the like. In some embodiments, fee may include one-time fee, fee per product or service, fee per number of provider 116, fee per number of data discrepancy 136, or the like. As a non-limiting example, fee information may include a maintenance fee. For example, and without limitation, maintenance fee may include annual fee and fee per number of service. As another non-limiting example, fee information may include a record fee. For the purposes of this disclosure, a "record fee" is a fee for analyzing a record to find a data discrepancy. For example, and without limitation, record fee may include fee per number of record 112 analyzed or the like. As another non-limiting example, fee information may include an initiation fee. For the purposes of this disclosure, an "initiation fee" is a fee for establishment or initiation of service. For example, and without limitation, initiation fee may include one-time fee and fee per number of service. In some embodiments, initiation fee may include a plurality different initiation fee for provider 116. For example, and without limitation, provider 116 that includes 10 services may include $7500 for 3 services and $5000 for 7 services. The examples above are merely examples and persons skilled in the art, upon reviewing the entirety of this disclosure, may appreciate various fee for provider 116. For example, and without limitation, in an exemplary scenario, for 'Company 1' that includes 9 services and have used apparatus 100 for 1 year analyzing 130000 records 112, processor 104 may transmit completion datum that includes maintenance fee of annual $1500 for each 9 services, record fee of $0.50 for each records 112 for each 9 services and initiation fee of one-time fee $7500 for each 9 services, which is total of $146000. If completion datum was sent annually, provider 116 may have received completion datum that includes $14600. If completion datum was sent monthly, provider 116 may have received completion datum that includes $12166.67 each month for 1 year.

With continued reference to FIG. 1, in some embodiments, processor 104 may generate a discrepancy report and transmit the discrepancy report to provider 116. For the purposes of this disclosure, a "discrepancy report" is an analysis of records related its data discrepancy. In some embodiments, discrepancy report may encompass an analysis of all records 112 of provider 116. In some embodiments, discrepancy report may encompass an analysis of all records 112 of a specific service or product of provider 116. In some embodiments, discrepancy report may include an analysis of a frequency of having data discrepancy 136 in records 112. In some embodiments, discrepancy report may include an analysis of types of data discrepancy 136 found in records 112. In some embodiments, discrepancy report may include an analysis of types of data or record elements 132 of records 112 that includes data discrepancy 136. In some embodiments, discrepancy report may include an analysis of a comparison of a plurality of discrepancy reports. In some embodiments, discrepancy report may be stored in record database 128. In some embodiments, discrepancy report may be retrieved from record database 128. In some embodiments, processor 104 may transmit discrepancy report to provider device 124 or user device 164.

Referring now to FIGS. 2A-D, exemplary graphical user interface (GUI) 200 of provider device 124 is illustrated. In FIGS. 2A-D, illustrated GUI 200 are merely examples and persons skilled in the art, upon reviewing the entirety of this disclosure, may appreciate various ways to display data using GUI 200. GUI 200 and provider device 124 disclosed herein are described in detail with respect to FIG. 1. In some embodiments, provider device 124 may include a smartphone, tablet, laptop, desktop, smartwatch, or the like. In some embodiments, processor 104 may transmit data to provider device 124. In some embodiments, processor 104 may transmit data to user device 164. In some embodiments, processor 104 may generate GUI 200 to display transmitted data. As a non-limiting example, transmitted data may include record 112, record element 132, proof 140 proof element 144, data discrepancy 136, discrepancy solution, solution template, discrepancy template 152, updated record 156, discrepancy report, and/or the like. In some embodiments, GUI 200 may display information using text, image, graph, video, table, list, or the like. As a non-limiting example, GUI 200 may display data discrepancy 136 using text. For example, and without limitation, GUI 200 may display a list of data discrepancies 136 found from record 112. As another non-limiting example, GUI 200 may display updated record 156 using text and/or graph.

Figure 2C:
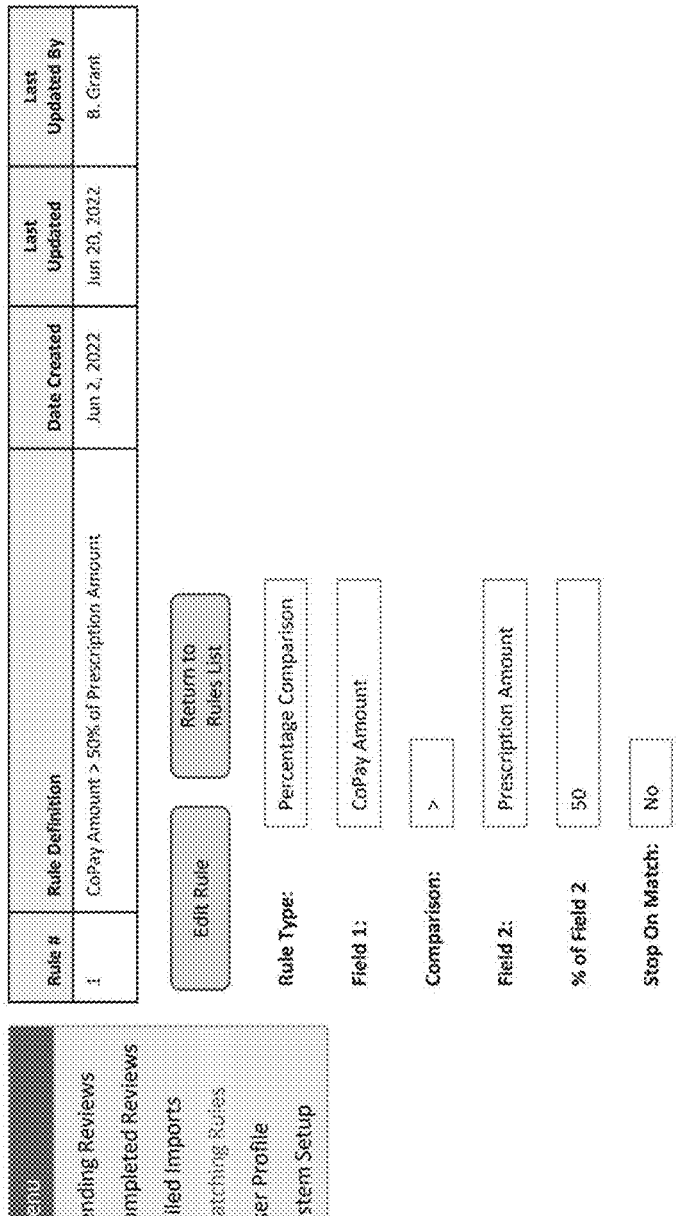

With continued reference to FIGS. 2A-D, in some embodiments, provider 116 may interact with GUI 200 using provider device 124. In some embodiments, user 120 may interact with GUI 200 using user device 164. As a non-limiting example, provider 116 or user 120 may touch a touch screen of provider device 124 or user device 164, click, type, drag, or the like to interact with GUI 200. In some embodiments, GUI 200 may include a menu bar 204. As a non-limiting example, provider 116 may click an option in menu bar 204 to bring data related to the option. In a non-limiting example, provider 116 may click 'pending reviews' in menu bar 204 to check records 112 that needs to be reviewed to solve data discrepancy 136 as illustrated in FIG. 2A. In another non-limiting example, provider 116 may click 'completed reviews' in menu bar 204 to check updated records 156 as illustrated in FIG. 2B. In another non-limiting example, provider 116 may click 'failed imports' in menu bar 204 to check records 112 that has failed to be uploaded or transmitted to processor 104. In another non-limiting example, provider 116 may click 'matching rules' in menu bar 204 to review, add, edit or delete discrepancy template 152 as illustrated in FIG. 2C. In another non-limiting example, provider 116 may click 'client management' in menu bar 204 to review, add, edit or delete user profile as illustrated in FIG. 2D. The examples above are merely examples and persons skilled in the art, upon reviewing the entirety of this disclosure, may appreciate various options in menu bar 204 and related data. In some embodiments, processor 104 may receive provider response or user response.

Figure 3:
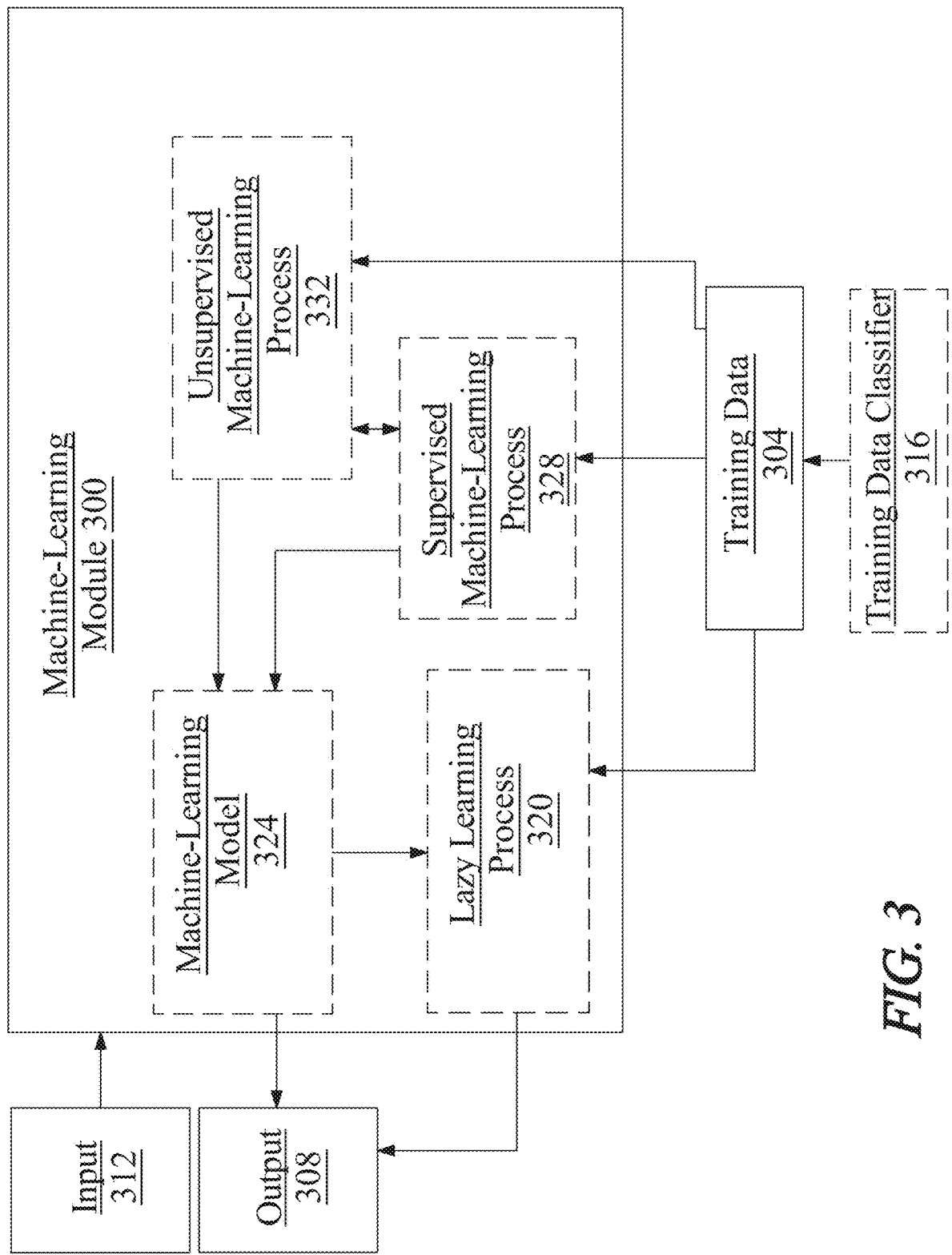
FIG. 3 illustrates a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

With continued reference to FIG. 3, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

With continued reference to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or Ie Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 3, machine-learning algorithms may include at least a supervised machine-learning process 328. At least a supervised machine-learning process 328, as defined herein, include algorithms that receive a training set relating several inputs to outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With continued reference to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of one divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
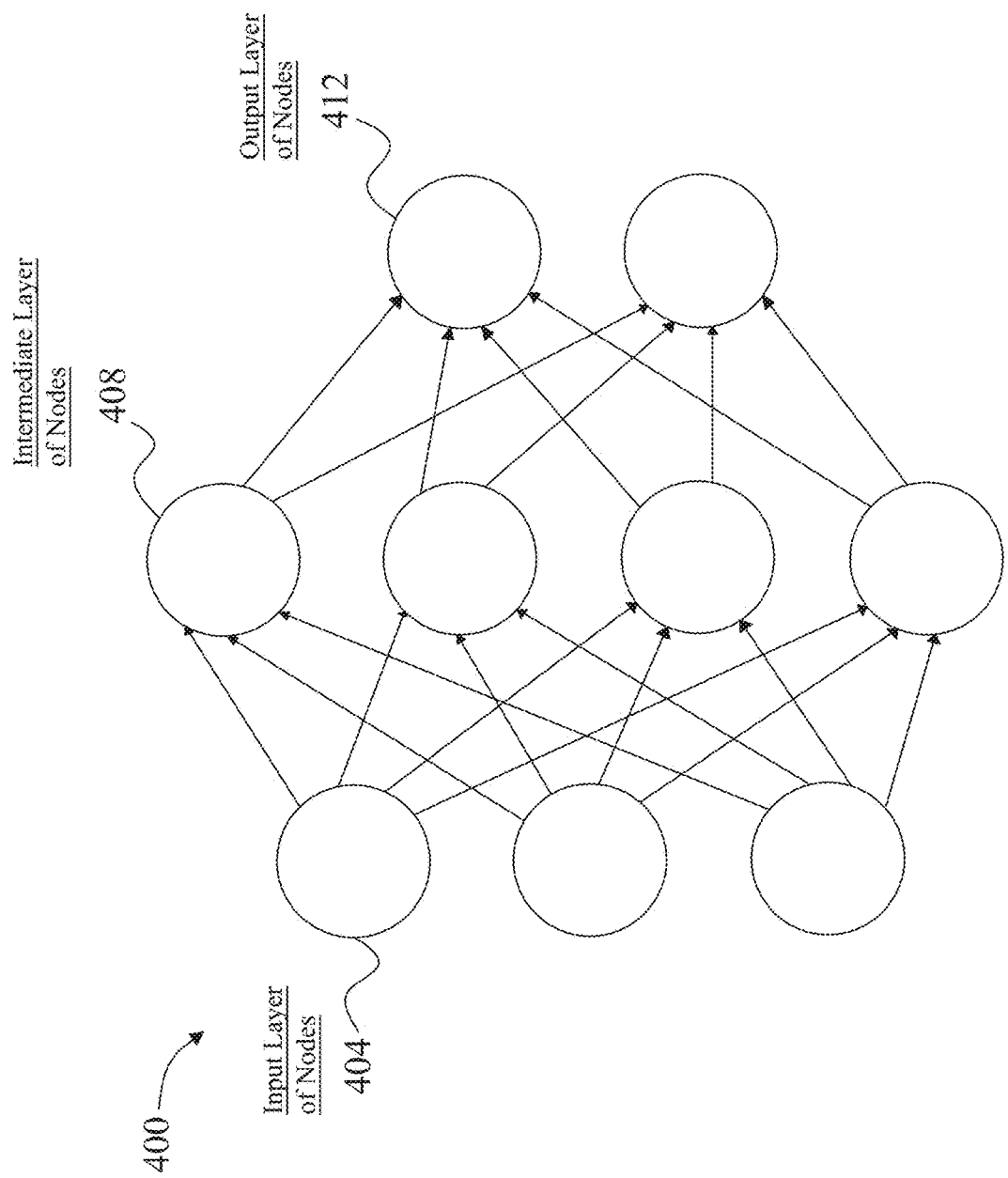
FIG. 4 illustrates a diagram of an exemplary nodal network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
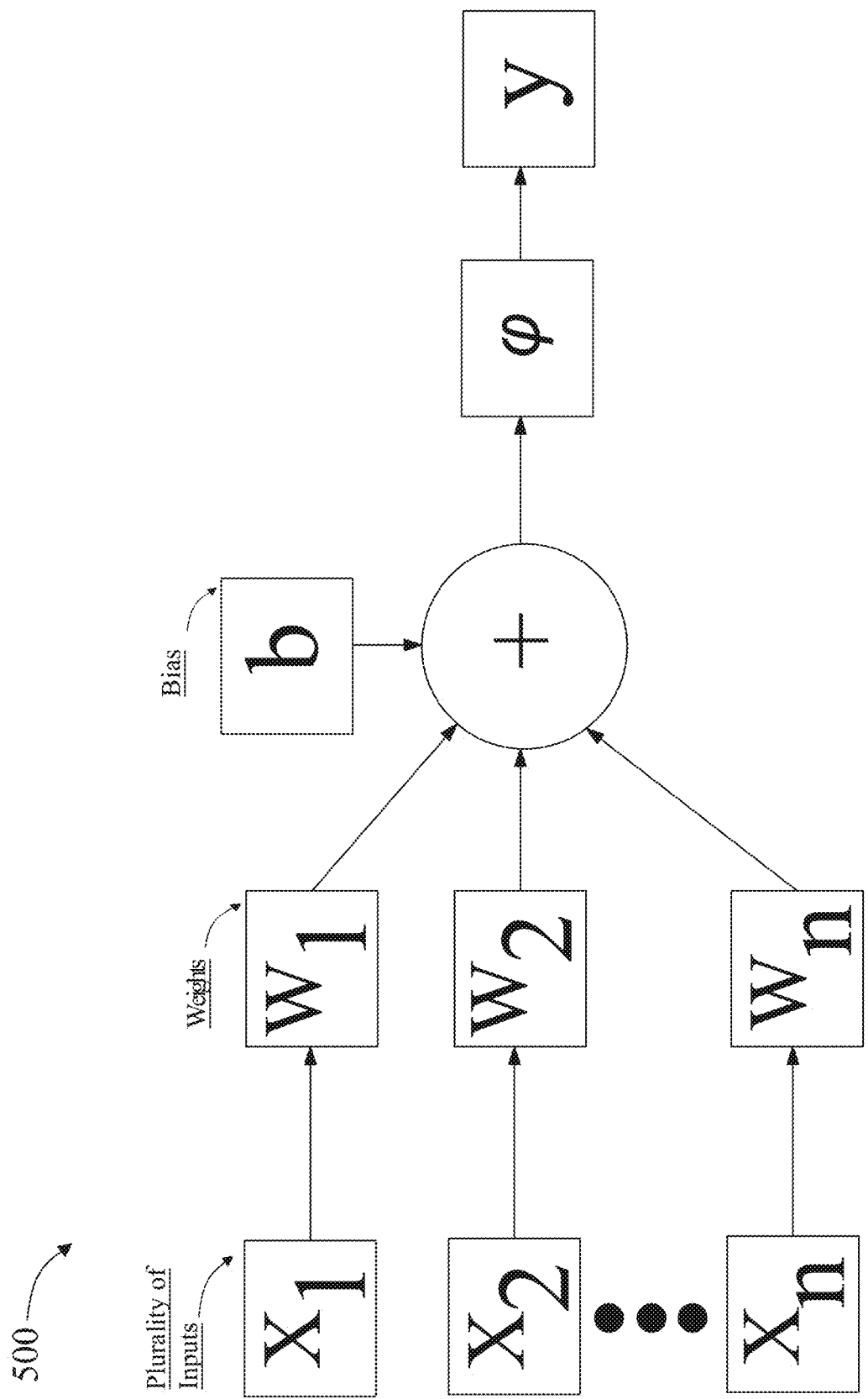
FIG. 5 illustrates a block diagram of an exemplary node.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
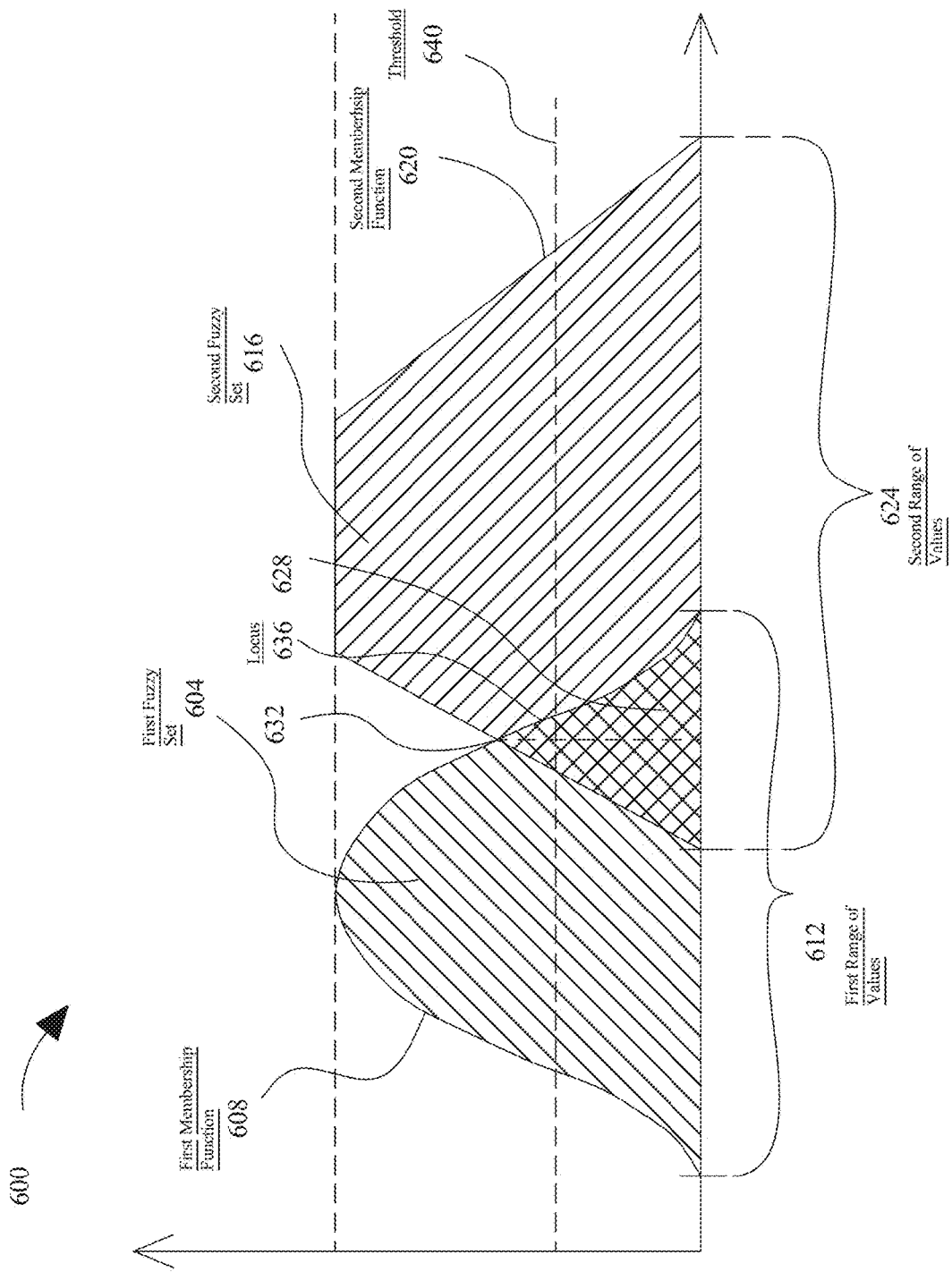
FIG. 6 illustrates a block diagram of a fuzzy set system.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{3b}\right]^{-1}$$

Persons skilled in the art, upon reviewing the entirety of this disclosure, will be aware of various alternative or additional membership functions that may be used consistently with this disclosure.

With continued reference to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or an assessed groups, alone or in combination. Alternatively or additionally, each threshold may be tuned by a machine-learning and/or statistical process, for instance and without limitation as described in further detail below.

With continued reference to FIG. 6, in an embodiment, record may be compared to multiple proofs fuzzy sets. For instance, action template data may be represented by a fuzzy set that is compared to each of the multiple proof fuzzy sets; and a degree of overlap exceeding a threshold between the record fuzzy set and any of the multiple proofs fuzzy sets may cause processor to rank proofs as a function of the record. For instance, in one embodiment there may be two proof fuzzy sets, representing respectively a first proof and a second proof. First proof may have a first fuzzy set; and second proof may have a second fuzzy set. Processor 104, for example, may compare a record fuzzy set with each of the first and second proof fuzzy sets, as described above, and classify a user profile to either, both, or neither of the first and second proofs. Machine-learning methods as described throughout may, in a non-limiting example, generate coefficients used in fuzzy set equations as described above, such as without limitation x, c, and σ of a Gaussian set as described above, as outputs of machine-learning methods. Likewise, record may be used indirectly to determine a fuzzy set, as record fuzzy set may be derived from outputs of one or more machine-learning models that take the record such as products and/or data directly or indirectly as inputs.

With continued reference to FIG. 6, a computing device may use a logic comparison program, such as, but not limited to, a fuzzy logic model to determine a correlation between a plurality of record and a plurality of proofs. A correlation between record and proofs may include, but is not limited to, irrelevant, poor, average, high, and the like; each such designation may be represented as a value for a linguistic variable representing correlation, or in other words, a fuzzy set as described above that corresponds to a degree of positive correlations as calculated using any statistical, machine-learning, or other method that may occur to a person skilled in the art upon reviewing the entirety of this disclosure. In other words, a given element of record object may have a first non-zero value for membership in a first linguistic variable value such as a high correlation and a second non-zero value for membership in a second linguistic variable value such as average correlation. In some embodiments, determining a correlation may include using a linear regression model. A linear regression model may include a machine learning model. A linear regression model may be trained using a machine learning process. A linear regression model may map statistics such as, but not limited to, degree of similarity with respect to the type of record and proofs. In some embodiments, determining a correlation between record and proofs may include using a classification model. The classification model may be configured to input collected data and cluster data to a centroid based on, but not limited to, frequency of appearance, linguistic indicators of correlation, and the like.

Centroids may include scores assigned to them such that level of correlation of record and proofs may each be assigned a score. In some embodiments, the classification model may include a K-means clustering model. In some embodiments, the classification model may include a particle swarm optimization model. In some embodiments, determining the classification model may include using a fuzzy inference engine. A fuzzy inference engine may be configured to map one or more elements of record and proof data using fuzzy logic. In some embodiments, record and proofs may be arranged by a logic comparison program into various levels of correlation arrangements. A "correlation arrangement" as used in this disclosure is any grouping of objects and/or data based on degree of match based on proof assessment. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure. Additionally and/or alternatively, the fuzzy set may be incorporated with record.

Figure 7:
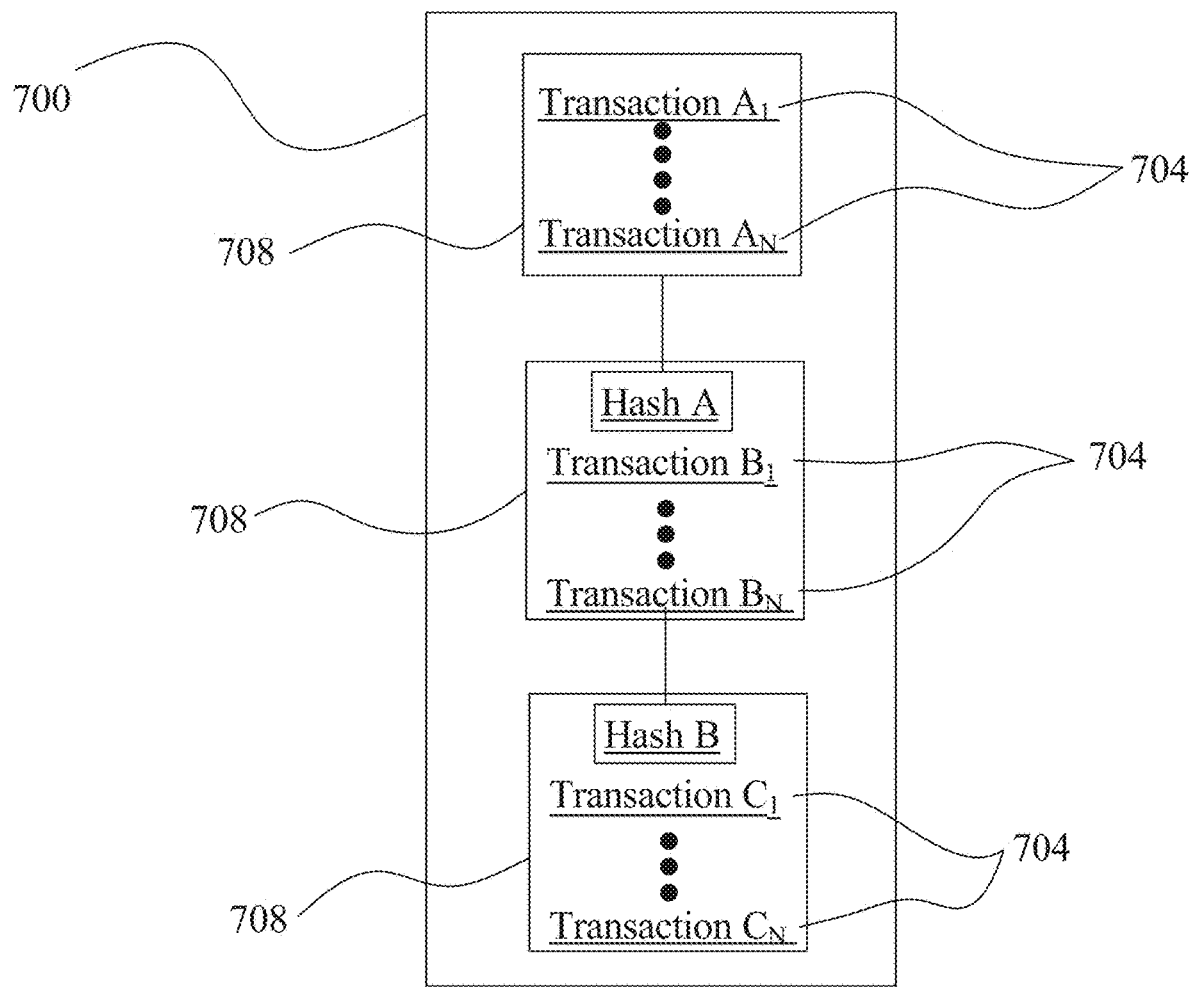
FIG. 7 illustrates a block diagram of exemplary embodiment of an immutable sequential listing.

Referring now to FIG. 7, an exemplary embodiment of an immutable sequential listing 700 is illustrated. An immutable sequential listing 700 may be, include and/or implement an immutable ledger, where data entries that have been posted to immutable sequential listing 700 cannot be altered. Data elements are listed in immutable sequential listing 700; data elements may include any form of data, including textual data, image data, encrypted data, cryptographically hashed data, and the like. Data elements include, without limitation, one or more at least a digitally signed assertions. In one embodiment, a digitally signed assertion 704 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 704. In an embodiment, collection of textual data states that the owner of a certain transferable item represented in a digitally signed assertion 704 register is transferring that item to the owner of an address. A digitally signed assertion 704 may be signed by a digital signature created using the private key associated with the owner's public key, as described above.

With continued reference to FIG. 7, a digitally signed assertion 704 may describe a transfer of a NFT and/or virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 704 may describe the transfer of a physical good; for instance, a digitally signed assertion 704 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 704 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

With continued reference to FIG. 7, in one embodiment, an address is a textual datum identifying the recipient of virtual currency or another item of value in a digitally signed assertion 704. In some embodiments, address is linked to a public key, the corresponding private key of which is owned by the recipient of a digitally signed assertion 704. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 704 may record a subsequent a digitally signed assertion 704 transferring some or all of the value transferred in the first a digitally signed assertion 704 to a new address in the same manner. A digitally signed assertion 704 may contain textual information that is not a transfer of some item of value in addition to, or as an alternative to, such a transfer. For instance, as described in further detail below, a digitally signed assertion 704 may indicate a confidence level associated with a distributed storage node as described in further detail below.

In an embodiment, and with continued reference to FIG. 7 immutable sequential listing 700 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 700 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

With continued reference to FIG. 7, immutable sequential listing 700 may preserve the order in which the at least a posted content took place by listing them in chronological order; alternatively or additionally, immutable sequential listing 700 may organize digitally signed assertions 704 into sub-listings 708 such as "blocks" in a blockchain, which may be themselves collected in a temporally sequential order; digitally signed assertions 704 within a sub-listing 708 may or may not be temporally sequential. The ledger may preserve the order in which at least a posted content took place by listing them in sub-listings 708 and placing the sub-listings 708 in chronological order. Immutable sequential listing 700 may be a distributed, consensus-based ledger, such as those operated according to the protocols promulgated by Ripple Labs, Inc., of San Francisco, Calif, or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 700 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 7, immutable sequential listing 700, once formed, may be inalterable by any party, no matter what access rights that party possesses. For instance, immutable sequential listing 700 may include a hash chain, in which data is added during a successive hashing process to ensure non-repudiation. Immutable sequential listing 700 may include a block chain. In one embodiment, a block chain is immutable sequential listing 700 that records one or more new at least a posted content in a data item known as a sub-listing 708 or "block." An example of a block chain is the BITCOIN block chain used to record BITCOIN transactions and values. Sub-listings 708 may be created in a way that places the sub-listings 708 in chronological order and link each sub-listing 708 to a previous sub-listing 708 in the chronological order so that any computing device may traverse the sub-listings 708 in reverse chronological order to verify any at least a posted content listed in the block chain. Each new sub-listing 708 may be required to contain a cryptographic hash describing the previous sub-listing 708. In some embodiments, the block chain contains a single first sub-listing 708 sometimes known as a "genesis block."

With continued reference to FIG. 7, the creation of a new sub-listing 708 may be computationally expensive; for instance, the creation of a new sub-listing 708 may be designed by a "proof of work" protocol accepted by all participants in forming immutable sequential listing 700 to take a powerful set of computing devices a certain period of time to produce. Where one sub-listing 708 takes less time for a given set of computing devices to produce the sub-listing 708 protocol may adjust the algorithm to produce the next sub-listing 708 so that it will require more steps; where one sub-listing 708 takes more time for a given set of computing devices to produce the sub-listing 708 protocol may adjust the algorithm to produce the next sub-listing 708 so that it will require fewer steps. As an example, protocol may require a new sub-listing 708 to contain a cryptographic hash describing its contents; the cryptographic hash may be required to satisfy a mathematical condition, achieved by having the sub-listing 708 contain a number, called a nonce, whose value is determined after the fact by the discovery of the hash that satisfies the mathematical condition. Continuing the example, the protocol may be able to adjust the mathematical condition so that the discovery of the hash describing a sub-listing 708 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 708 according to the protocol is known as "mining." The creation of a new sub-listing 708 may be designed by a "proof of stake" protocol as will be apparent to those skilled in the art upon reviewing the entirety of this disclosure.

With continued reference to FIG. 7, in some embodiments, protocol also creates an incentive to mine new sub-listings 708. The incentive may be financial; for instance, successfully mining a new sub-listing 708 may result in the person or entity that mines the sub-listing 708 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 708. Each sub-listing 708 created in immutable sequential listing 700 may contain a record or at least a posted content describing one or more addresses that receive an incentive, such as virtual currency, as the result of successfully mining the sub-listing 708.

With continued reference to FIG. 7, where two entities simultaneously create new sub-listings 708, immutable sequential listing 700 may develop a fork; protocol may determine which of the two alternate branches in the fork is the valid new portion of the immutable sequential listing 700 by evaluating, after a certain amount of time has passed, which branch is longer. "Length" may be measured according to the number of sub-listings 708 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 708 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 700 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 700.

With continued reference to FIG. 7, additional data linked to at least a posted content may be incorporated in sub-listings 708 in immutable sequential listing 700; for instance, data may be incorporated in one or more fields recognized by block chain protocols that permit a person or computer forming a at least a posted content to insert additional data in immutable sequential listing 700. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 7, in some embodiments, virtual currency is traded as a crypto currency. In one embodiment, a crypto currency is a digital currency such as Bitcoins, Peercoins, Namecoins, and Litecoins. Crypto-currency may be a clone of another crypto-currency. The crypto-currency may be an "altcoin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 708 in a block chain computationally challenging; the incentive for producing sub-listings 708 may include the grant of new crypto currency to the miners. Quantities of crypto currency may be exchanged using at least a posted content as described above.

Figure 8:
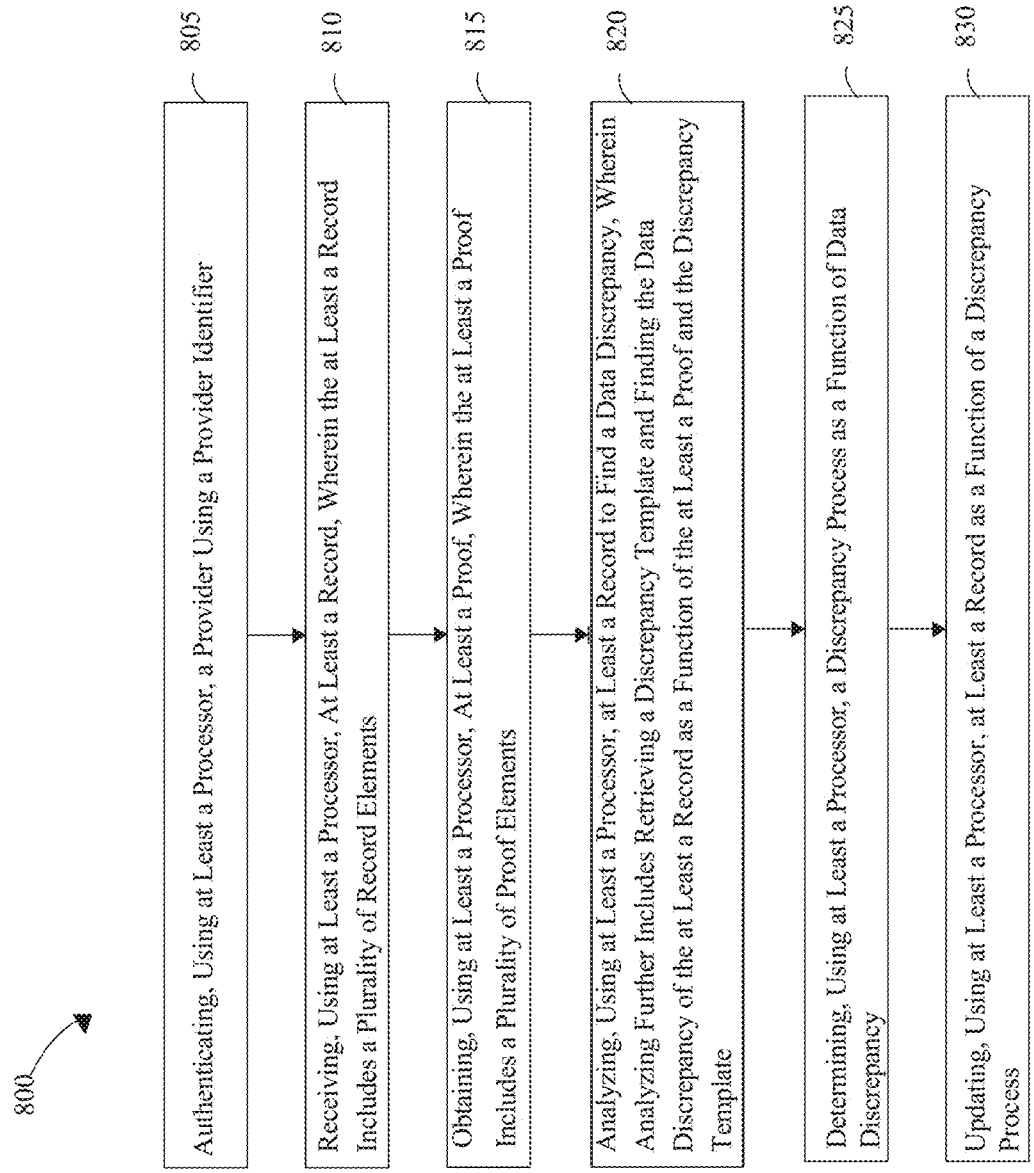
FIG. 8 illustrates a flow diagram of an exemplary method for data discrepancy identification.

Referring now to FIG. 8, a flow diagram of an exemplary method 800 for data discrepancy identification. Method 800 includes a step 805 of authenticating, using at least a processor, a provider using a provider identifier. These may be implemented as disclosed with respect to FIGS. 1-7.

With continued reference FIG. 8, method 800 includes a step 810 of receiving, using at least a processor, at least a record, wherein the at least a record includes a plurality of record elements. These may be implemented as disclosed with respect to FIGS. 1-7.

With continued reference FIG. 8, method 800 includes a step 815 of obtaining, using at least a processor, at least a proof, wherein the at least a proof includes a plurality of proof elements. In some embodiments, the at least a proof may include a second record of the at least a record and the data discrepancy may further include a duplication of a first record of the at least a record and the second record. These may be implemented as disclosed with respect to FIGS. 1-7.

With continued reference FIG. 8, method 800 includes a step 820 of analyzing, using at least a processor, at least a record to find a data discrepancy. Step 820 further includes retrieving a discrepancy template and finding the data discrepancy of the at least a record as a function of at least a proof and the discrepancy template. In some embodiments, method 800 may further include finding, using the at least a processor, the data discrepancy using a discrepancy machine learning model, wherein the discrepancy machine learning model is trained with discrepancy training data that correlates a record data set with a discrepancy template data set and outputs the data discrepancy. These may be implemented as disclosed with respect to FIGS. 1-7.

With continued reference FIG. 8, method 800 includes a step 825 of determining, using at least a processor, a discrepancy process as a function of a data discrepancy. In some embodiments, the discrepancy process may include automatically updating the at least a record as a function of the discrepancy solution. These may be implemented as disclosed with respect to FIGS. 1-7.

With continued reference FIG. 8, method 800 includes a step 830 of updating, using at least a processor, at least a record as a function of a discrepancy process. In some embodiments, method 800 may further include generating, using the at least a processor, a discrepancy solution as a function of a data discrepancy. In some embodiments, the discrepancy solution may include a data removal of a duplication of the data discrepancy. In some embodiments, method 800 may further include receiving, using the at least a processor, a non-discrepancy filter and updating, using the at least a processor, the at least a record as a function of the non-discrepancy filter. In some embodiments, method 800 may further include generating, using the at least a processor, a graphical user interface (GUI) displaying the data discrepancy. In some embodiments, method 800 may further include receiving, using the at least a processor, a provider response of the data discrepancy and updating, using the at least a processor, the at least a record as a function of the provider response. In some embodiments, method 800 may further include receiving, using the at least a processor, a user response of the updated record, wherein the user response may include a rejection. These may be implemented as disclosed with respect to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
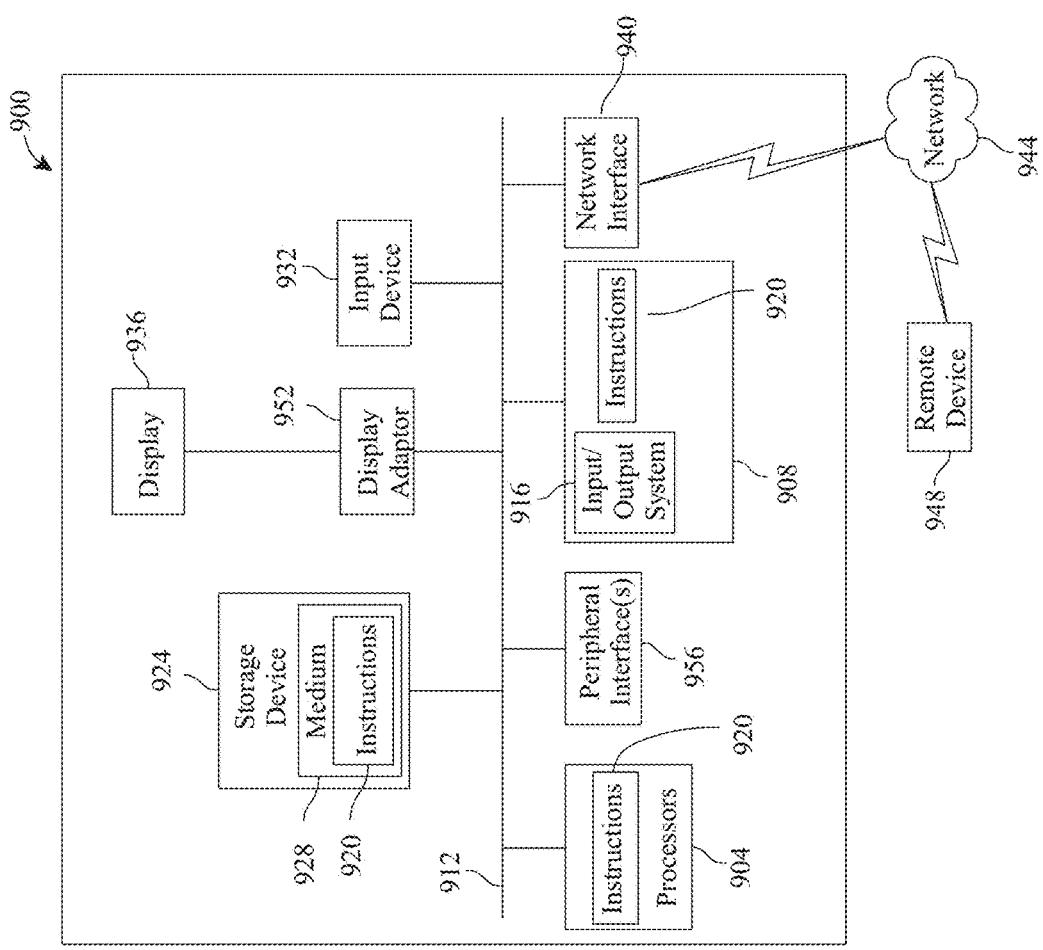
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for data discrepancy identification, the apparatus comprising:
   at least a processor; and
   a memory communicatively connected to the at least a processor, wherein the memory contains instructions configuring the at least a processor to:
   authenticate a provider using a provider identifier;
   receive at least a record from the provider, wherein the at least a record comprises a plurality of record elements;
   obtain at least a proof, wherein the at least a proof comprises a plurality of proof elements;
   analyze the at least a record to find a data discrepancy, wherein analyzing further comprises:
   finding the data discrepancy of the at least a record as a function of the at least a proof and the discrepancy template, wherein finding the data discrepancy further comprises:
   training, iteratively, a discrepancy machine-learning model using training data, wherein discrepancy training data correlates a proof data set comprising evidence of information of the record from a record database with a discrepancy template data set comprising a predetermined record validation rule and stored in the record database; and
   generating, using the trained machine-learning model, the data discrepancy wherein the at least a proof is provided to the trained machine-learning model as an input to output the data discrepancy;
   determine a discrepancy process as a function of the data discrepancy; and
   update the at least a record as a function of the discrepancy process.

2. The apparatus of claim 1, wherein:
   the at least a proof comprises a second record of the at least a record; and
   the data discrepancy further comprises a duplication of a first record of the at least a record and the second record.

3. The apparatus of claim 2, wherein the memory contains instructions further configuring the at least a processor to find the data discrepancy using a discrepancy machine learning model, wherein the discrepancy machine learning model is trained with discrepancy training data that correlates a record data set with a discrepancy template data set and outputs the data discrepancy.

4. The apparatus of claim 1, wherein the memory contains instructions further configuring the at least a processor to generate a discrepancy solution as a function of the data discrepancy.

5. The apparatus of claim 4, wherein the discrepancy solution comprises a data removal of a duplication of the data discrepancy.

6. The apparatus of claim 4, wherein the discrepancy process comprises automatically updating the at least a record as a function of the discrepancy solution.

7. The apparatus of claim 1, wherein the memory contains instructions further configuring the at least a processor to:
   receive a non-discrepancy filter; and
   update the at least a record as a function of the non-discrepancy filter.

8. The apparatus of claim 1, wherein the memory contains instructions further configuring the at least a processor to:
   receive a provider response of the data discrepancy; and
   update the at least a record as a function of the provider response.

9. The apparatus of claim 1, wherein the memory contains instructions further configuring the at least a processor to generate a graphical user interface (GUI) displaying the data discrepancy.

10. The apparatus of claim 1, wherein the memory contains instructions further configuring the at least a processor to receive a user response of the updated record, wherein the user response comprises a rejection.

11. A method for data discrepancy identification, the method comprising:
- authenticating, using at least a processor, a provider using a provider identifier;
- receiving, using the at least a processor, at least a record, wherein the at least a record comprises a plurality of record elements;
- obtaining, using the at least a processor, at least a proof, wherein the at least a proof comprises a plurality of proof elements;
- analyzing, using the at least a processor, the at least a record to find a data discrepancy, wherein analyzing further comprises:
  - finding the data discrepancy of the at least a record as a function of the at least a proof and the discrepancy template, wherein finding the data discrepancy further comprises:
  - training, iteratively, using at least a processor, a discrepancy machine-learning model using training data, wherein discrepancy training data correlates a proof data set comprising evidence of information of the record from a record database with a discrepancy template data set comprising a predetermined record validation rule and stored in the record database; and
  - generating, using the at least a processor and the trained machine-learning model, the data discrepancy wherein the at least a proof is provided to the trained machine-learning model as an input to output the data discrepancy;
- determining, using the at least a processor, a discrepancy process as a function of the data discrepancy; and
- updating, using the at least a processor, the at least a record as a function of the discrepancy process.

12. The method of claim 11, further comprising:
- the at least a proof comprises a second record of the at least a record; and
- the data discrepancy further comprises a duplication of a first record of the at least a record and the second record.

13. The method of claim 12, further comprising:
- finding, using the at least a processor, the data discrepancy using a discrepancy machine learning model, wherein the discrepancy machine learning model is trained with discrepancy training data that correlates a record data set with a discrepancy template data set and outputs the data discrepancy.

14. The method of claim 11, further comprising:
- generating, using the at least a processor, a discrepancy solution as a function of the data discrepancy.

15. The method of claim 14, wherein the discrepancy solution comprises a data removal of a duplication of the data discrepancy.

16. The method of claim 14, wherein the discrepancy process comprises automatically updating the at least a record as a function of the discrepancy solution.

17. The method of claim 11, further comprising:
- receiving, using the at least a processor, a non-discrepancy filter; and
- updating, using the at least a processor, the at least a record as a function of the non-discrepancy filter.

18. The method of claim 11, further comprising:
- receiving, using the at least a processor, a provider response of the data discrepancy; and
- updating, using the at least a processor, the at least a record as a function of the provider response.

19. The method of claim 11, further comprising:
- generating, using the at least a processor, a graphical user interface (GUI) displaying the data discrepancy.

20. The method of claim 11, further comprising:
- receiving, using the at least a processor, a user response of the updated record, wherein the user response comprises a rejection.

\* \* \* \* \*